United States Patent [19]

Lynch-Freshner et al.

[11] Patent Number: 5,668,997
[45] Date of Patent: Sep. 16, 1997

[54] OBJECT-ORIENTED SYSTEM FOR SERVICING WINDOWS

[75] Inventors: Lawrence A. Lynch-Freshner, Boulder Creek; Donald M. Marsh, Mountain View; Steve H. Milne, Palo Alto; Jeff A. Zias, Saratoga, all of Calif.

[73] Assignee: Object Technology Licensing Corp., Cupertino, Calif.

[21] Appl. No.: 573,916

[22] Filed: Dec. 18, 1995

Related U.S. Application Data

[63] Continuation of Ser. No. 328,230, Oct. 25, 1994, abandoned.
[51] Int. Cl.$^6$ ............................................. G06F 3/14
[52] U.S. Cl. ............................................ 395/683; 345/333
[58] Field of Search .................................. 395/333, 683, 395/500, 701, 712, 201, 800

[56] References Cited

U.S. PATENT DOCUMENTS

| | | | |
|---|---|---|---|
| 4,821,220 | 4/1989 | Duisberg | 264/578 |
| 4,885,717 | 12/1989 | Beck et al. | 364/900 |
| 4,891,630 | 1/1990 | Friedman et al. | 340/706 |
| 4,899,136 | 2/1990 | Beard et al. | 345/156 |
| 4,937,036 | 6/1990 | Beard et al. | 345/156 |
| 4,939,507 | 7/1990 | Beard et al. | 345/156 |
| 4,953,080 | 8/1990 | Dysart et al. | 364/200 |
| 5,041,992 | 8/1991 | Cunningham et al. | 364/518 |
| 5,050,090 | 9/1991 | Golub et al. | 364/478 |
| 5,060,276 | 10/1991 | Morris et al. | 382/8 |
| 5,062,060 | 10/1991 | Kolnick | 395/159 |
| 5,075,848 | 12/1991 | Lai et al. | 395/425 |

(List continued on next page.)

OTHER PUBLICATIONS

PC Tech Journal, v.7.2, Feb. 1989, US, pp. 106–118, R.R. Morris et al., "A Graphic Comparison".

IBM "OS/2 2.0 Presentation Manager Programming Guide", Mar. 1992, QUE, US, pp. 1–1.

Moskowitz and Kerr: "OS/2 2.1 Unleashed", 1993, Sams Publishing, US, pp. 465, 466, 471.

IEEE Computer Graphics and Applications, v.11.3, May 1991, pp. 75–84, David Pinedo "Window Clipping Methods in Graphics Accelerators", pp. 76, 78.

IBM Technical Disclosure Bulletin, v.37, No.1, Jan. 1994, New York, US, p. 581, "Walk–up–and Personalize Workstation Service".

IBM Technical Disclosure Bulletin, v.37.1, Jan. 1994, New York, US, pp. 455–456, "Free-Space Search for Best-Fit Placement of New Desktop Objects".

IBM Technical Disclosure Bulletin, v.36, No. 9B, Sep. 1993, New York, US, pp. 69–70, "Methodology for Application Output Routing on Multiple Display Systems".

Byte, v.19.2, Feb. 1994, St. Peterborough, US, pp. 146–169, Jim Hurd and Mark Paxson: "76 Cards for Fast Graphics".

OS/2 Developer, v.5.4, Sep./Oct. 1993, US, pp. 70–79, Pylee Lennil: "Demystifying the OS/2 Presentation Manager", pp. 70, 75.

*Primary Examiner*—Thomas G. Black
*Assistant Examiner*—Buay Lian Ho
*Attorney, Agent, or Firm*—Bookstein & Kudirka

[57] ABSTRACT

A window server communicates with clients and creates, destroys and modifies window objects. Objects are created in response to parameters provided by clients. Clients can obtain a variety of information regarding windows managed by the window server. Hardware windows are supported by subclassing objects, which provides polymorphic screen objects. Therefore, it does not matter whether the window is created by a hardware or software entity. Clients may be notified by the window server in response to certain events occurring with respect to particular windows, such as a configuration change. The window server also dynamically manages a default window layering scheme which takes into account the parameters specified, or not specified, by clients as well as the characteristics of the windows currently being managed by the window server. The window server also supports window clustering, which allows a window to span monitors. The window server also allows extensive changes to the characteristics of the desktop in response to configuration programs.

14 Claims, 17 Drawing Sheets

U.S. PATENT DOCUMENTS

| | | | |
|---|---|---|---|
| 5,093,914 | 3/1992 | Coplien et al. | 395/700 |
| 5,119,475 | 6/1992 | Smith et al. | 395/156 |
| 5,125,091 | 6/1992 | Staas, Jr. et al. | 395/650 |
| 5,133,075 | 7/1992 | Risch | 395/800 |
| 5,136,705 | 8/1992 | Stubbs et al. | 395/575 |
| 5,151,987 | 9/1992 | Abraham et al. | 395/575 |
| 5,181,162 | 1/1993 | Smith et al. | 364/419 |
| 5,247,669 | 9/1993 | Abraham et al. | 395/600 |
| 5,289,574 | 2/1994 | Sawyer | 395/157 |
| 5,313,636 | 5/1994 | Noble et al. | 395/700 |
| 5,315,703 | 5/1994 | Matheny et al. | 395/164 |
| 5,315,709 | 5/1994 | Alston, Jr. et al. | 395/600 |
| 5,317,741 | 5/1994 | Schwanke | 395/700 |
| 5,321,841 | 6/1994 | East et al. | 395/725 |
| 5,325,481 | 6/1994 | Hunt | 395/159 |
| 5,325,522 | 6/1994 | Vaughn | 395/600 |
| 5,325,524 | 6/1994 | Black | 395/600 |
| 5,325,533 | 6/1994 | McInerney et al. | 395/700 |
| 5,388,200 | 2/1995 | McDonald et al. | 395/157 |

OBJECT-ORIENTED SYSTEM FOR SERVICING WINDOWS

This is a continuation of application Ser. No. 08/328,230 filed on Oct. 25, 1994 abandoned.

COPYRIGHT NOTIFICATION

Portions of this patent application contain materials that are subject to copyright protection. The copyright owner has no objection to the facsimile reproduction by anyone of the patent document, or the patent disclosure, as it appears in the Patent and Trademark Office.

FIELD OF THE INVENTION

This invention generally relates to improvements in computer systems and, more particularly, to operating system software for managing window display areas in a graphic user interface.

BACKGROUND OF THE INVENTION

One of the most important aspects of a modern computing system is the interface between the human user and the machine. The earliest and most popular type of interface was text based; a user communicated with the machine by typing text characters on a keyboard and the machine communicated with the user by displaying text characters on a display screen. More recently, graphic user interfaces have become popular where the machine communicates with a user by displaying graphics, including text and pictures, on a display screen and the user communicates with the machine both by typing in textual commands and by manipulating the displayed pictures with a pointing device, such as a mouse.

Many modern computer systems operate with a graphic user interface called a window environment. In a typical window environment, the graphical display portrayed on the display screen is arranged to resemble the surface of an electronic "desktop" and each application program running on the computer is represented as one or more electronic "paper sheets" displayed in rectangular regions of the screen called "windows".

Each window region generally displays information which is generated by the associated application program and there may be several window regions simultaneously present on the desktop, each representing information generated by a different application program. An application program presents information to the user through each window by drawing or "painting" images, graphics or text within the window region. The user, in turn, communicates with the application by "pointing at" objects in the window region with a cursor which is controlled by a pointing device and manipulating or moving the objects and also by typing information into the keyboard. The window regions may also be moved around on the display screen and changed in size and appearance so that the user can arrange the desktop in a convenient manner.

Each of the window regions also typically includes a number of standard graphical objects such as sizing boxes, buttons and scroll bars. These features represent user interface devices that the user can point at with the cursor to select and manipulate. When the devices are selected or manipulated, the underlying application program is informed, via the window system, that the control has been manipulated by the user.

In general, the window environment described above is part of the computer operating system. The operating system also typically includes a collection of utility programs that enable the computer system to perform basic operations, such as storing and retrieving information on a disc memory and performing file operations including the creation, naming and renaming of files and, in some cases, performing diagnostic operations in order to discover or recover from malfunctions.

The last part of the computing system is the "application program" which interacts with the operating system to provide much higher level functionality, perform a specific task and provide a direct interface with the user. The application program typically makes use of operating system functions by sending out series of task commands to the operating system which then performs a requested task, for example, the application program may request that the operating system store particular information on the computer disc memory or display information on the video display.

FIG. 1 is a schematic illustration of a typical prior art computer system utilizing both an application program and an operating system. The computer system is schematically represented by dotted box 100, the application is represented by box 102 and the operating system by box 106. The previously-described interaction between the application program 102 and the operating system 106 is illustrated schematically by arrow 104. This dual program system is used on many types of computer systems ranging from main frames to personal computers.

The method for handling screen displays varies from computer to computer and, in this regard, FIG. 1 represents a prior art personal computer system. In order to provide screen displays, application program 102 generally stores information to be displayed (the storing operation is shown schematically by arrow 108) into a screen buffer 110. Under control of various hardware and soft-ware in the system the contents of the screen buffer 110 are read out of the buffer and provided, as indicated schematically by arrow 114, to a display adapter 112. The display adapter 112 contains hardware and software (sometimes in the form of firmware) which converts the information in screen buffer 110 to a form which can be used to drive the display monitor 118 which is connected to display adapter 112 by cable 116.

The prior art configuration shown in FIG. 1 generally works well in a system where a single application program 102 is running at any given time. This simple system works properly because the single application program 102 can write information into any area of the entire screen buffer area 110 without causing a display problem. However, if the configuration shown in FIG. 1 is used in a computer system where more than one application program 102 can be operational at the same time (for example, a "multi-tasking" computer system) display problems can arise. More particularly, if each application program has access to the entire screen buffer 110, in the absence of some direct communication between applications, one application may overwrite a portion of the screen buffer which is being used by another application, thereby causing the display generated by one application to be overwritten by the display generated by the other application.

Accordingly, mechanisms were developed to coordinate the operation of the application programs to ensure that each application program was confined to only a portion of the screen buffer thereby separating the other displays. This coordination became complicated in systems where windows were allowed to "overlap" on the screen display. When the screen display is arranged so that windows appear to "overlap", a window which appears on the screen in "front" of another window covers and obscures part of the underlying window. Thus, except for the foremost window, only part of the underlying windows may be drawn on the screen and be "visible" at any given time. Further, because the windows can be moved or resized by the user, the portion of each window which is visible changes as other windows are moved or resized. Thus, the portion of the screen buffer which is assigned to each application window also changes as windows from other applications are moved or resized.

In order to efficiently manage the changes to the screen buffer necessary to accommodate rapid screen changes caused by moving or resizing windows, the prior art computer arrangement shown in FIG. 1 was modified as shown in FIG. 2. In this new arrangement computer system 200 is controlled by one or more application programs, of which programs 202 and 216 are shown, which programs may be running simultaneously in the computer system. Each of the programs interfaces with the operating system 204 as illustrated schematically by arrows 206 and 220. However, in order to display information on the display screen, application programs 202 and 216 send display information to a central window manager program 218 located in the operating system 204. The window manager program 218, in turn, interfaces directly with the screen buffer 210 as illustrated schematically by arrow 208. The contents of screen buffer 210 are provided, as indicated by arrow 212, to a display adapter 214 which is connected by a cable 222 to a display monitor 224.

In such a system, the window manager 218 is generally responsible for maintaining all of the window displays that the user views during operation of the application programs. Since the window manager 218 is in communication with all application programs, it can coordinate between applications to insure that window displays do not overlap. Consequently, it is generally the task of the window manager to keep track of the location and size of the window and the window areas which must be drawn and redrawn as windows are moved.

The window manager 218 receives display requests from each of the applications 202 and 216. However, since only the window manager 218 interfaces with the screen buffer 210, it can allocate respective areas of the screen buffer 210 for each application and insure that no application erroneously overwrites the display generated by another application. There are a number of different window environments commercially available which utilize the arrangement illustrated in FIG. 2. These include the X/Window Operating environment, the WINDOWS, graphical user interface developed by the Microsoft Corporation and the OS/2 Presentation Manager, developed by the International Business Machines Corporation.

Each of these window environments has its own internal software architecture, but the architectures can all be classified by using a multi-layer model similar to the multi-layer models used to described computer network software. A typical multi-layer model includes the following layers:

User Interface

Window Manager

Resource Control and Communication

Component Driver Software

Computer Hardware where the term "window environment" refers to all of the above layers taken together.

The lowest or computer hardware level includes the basic computer and associated input and output devices including display monitors, keyboards, pointing devices, such as mice or trackballs, and other standard components, including printers and disc drives. The next or "component driver software" level consists of device-dependent software that generates the commands and signals necessary to operate the various hardware components. The resource control and communication layer interfaces with the component drivers and includes software routines which allocate resources, communicate between applications and multiplex communications generated by the higher layers to the underlying layers. The window manager handles the user interface to basic window operations, such as moving and resizing windows, activating or inactivating windows and redrawing and repainting windows. The final user interface layer provides high level facilities that implement the various controls (buttons, sliders, boxes and other controls) that application programs use to develop a complete user interface.

Although the arrangement shown in FIG. 2 solves the display screen interference problem, it suffers from the drawback that the window manager 218 must process the screen display requests generated by all of the application programs. Since the requests can only be processed serially, the requests are queued for presentation to the window manager before each request is processed to generate a display on terminal 224. In a display where many windows are present simultaneously on the screen, the window manager 218 can easily become a "bottleneck" for display information and prevent rapid changes by of the display by the application programs 202 and 216. A delay in the redrawing of the screen when windows are moved or repositioned by the user often manifests itself by the appearance that the windows are being constructed in a piecemeal fashion which becomes annoying and detracts from the operation of the system.

Accordingly, it is an object of the present invention to provide a window manager which can interface with application programs in such a manner that the screen display generated by each application program can be quickly and effectively redrawn.

It is another object of the present invention to provide a window manager which coordinates the display generation for all of the application programs or clients in order to prevent the applications or clients from interfering with each other or overwriting each other on the screen display.

It is yet another object of the present invention to provide a window manager which can interact with the application programs or clients by means of a simple command structure without the application programs being concerned with actual implementation details.

It is yet another object of the present invention to provide a window manager which allows application program developers who need detailed control over the screen display process to achieve this control by means of a full set of display control commands which are available, but need not be used by each application program.

SUMMARY OF THE INVENTION

The foregoing problems are overcome and the foregoing objects are achieved in an illustrative embodiment of the invention in which an object-oriented window server provides coordination between clients and the display system. Each client may create windows by sending parameters to the window server. The window server creates window objects in accordance with the parameters. The object-oriented design, and in particular the unique characteristics of the objects created by the window server, provide a consistent interface for clients desiring to create, modify and destroy various aspects of the display space, such as the desktop and elements thereof.

Upon receiving the parameters, the window server determines whether particular parameters are present. If particular parameters are present, a window is displayed in a position relative to the screen space and other windows according to the parameters. If the particular parameters are not present the window is displayed using a default layering scheme, and the window takes on parameters associated with the already displayed windows.

The window server also provides hardware windows which may be created by subclassing to create a polymorphic screen device object. It is then irrelevant to the window server whether the client is a hardware or software entity.

The window server further supports spanning of monitors by creating a cluster object which contains the internal windows necessary to span the monitors.

BRIEF DESCRIPTION OF THE DRAWINGS

The above and further advantages of the invention may be better understood by referring to the following description in conjunction with the accompanying drawings, in which.

DETAILED DESCRIPTION OF A PREFERRED EMBODIMENT OF THE INVENTION

Figure 1:
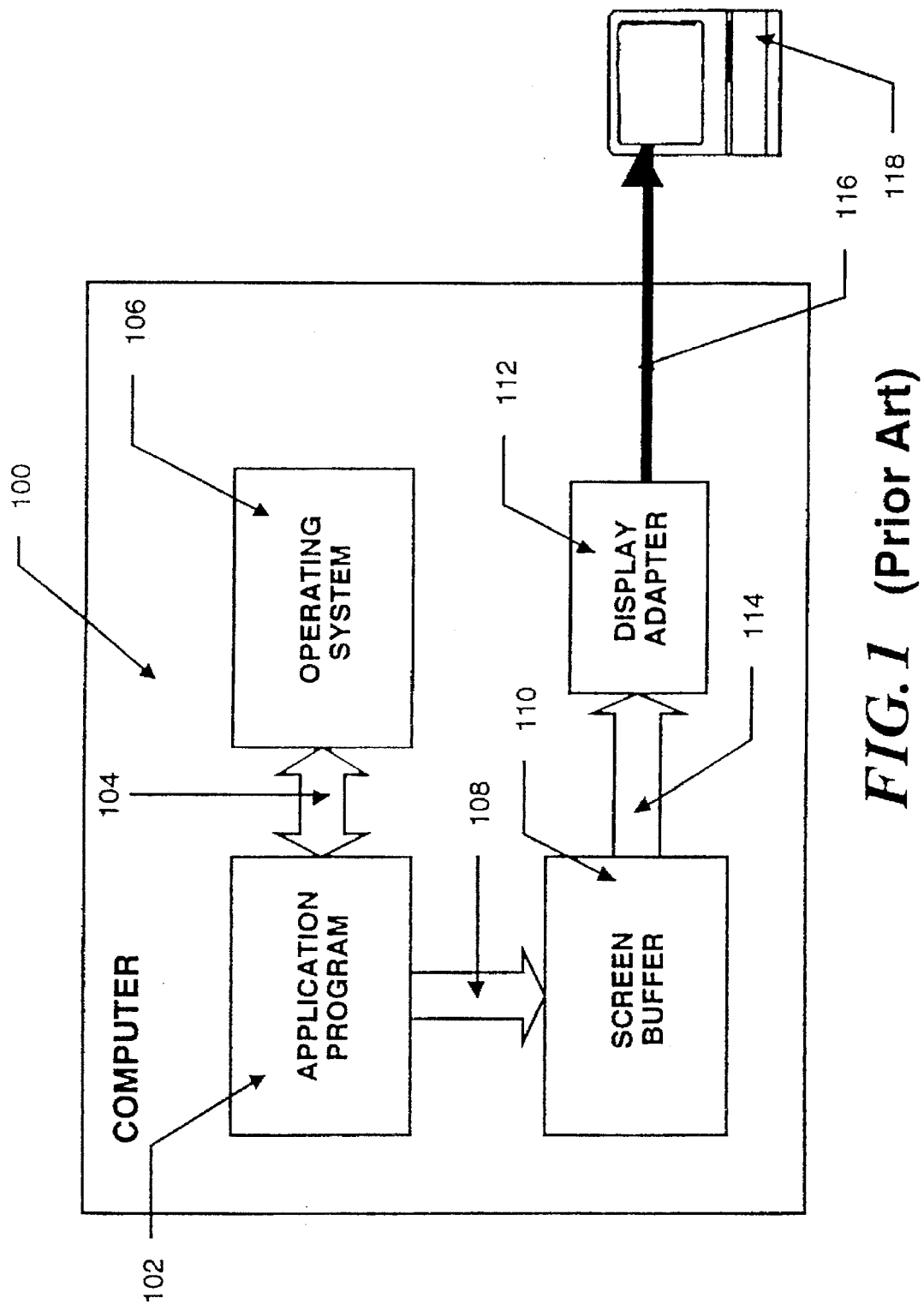
FIG. 1 is a schematic block diagram of a prior art computer system showing the relationship of the application program, the operating system, the screen buffer and, the display monitor.
Figure 2:
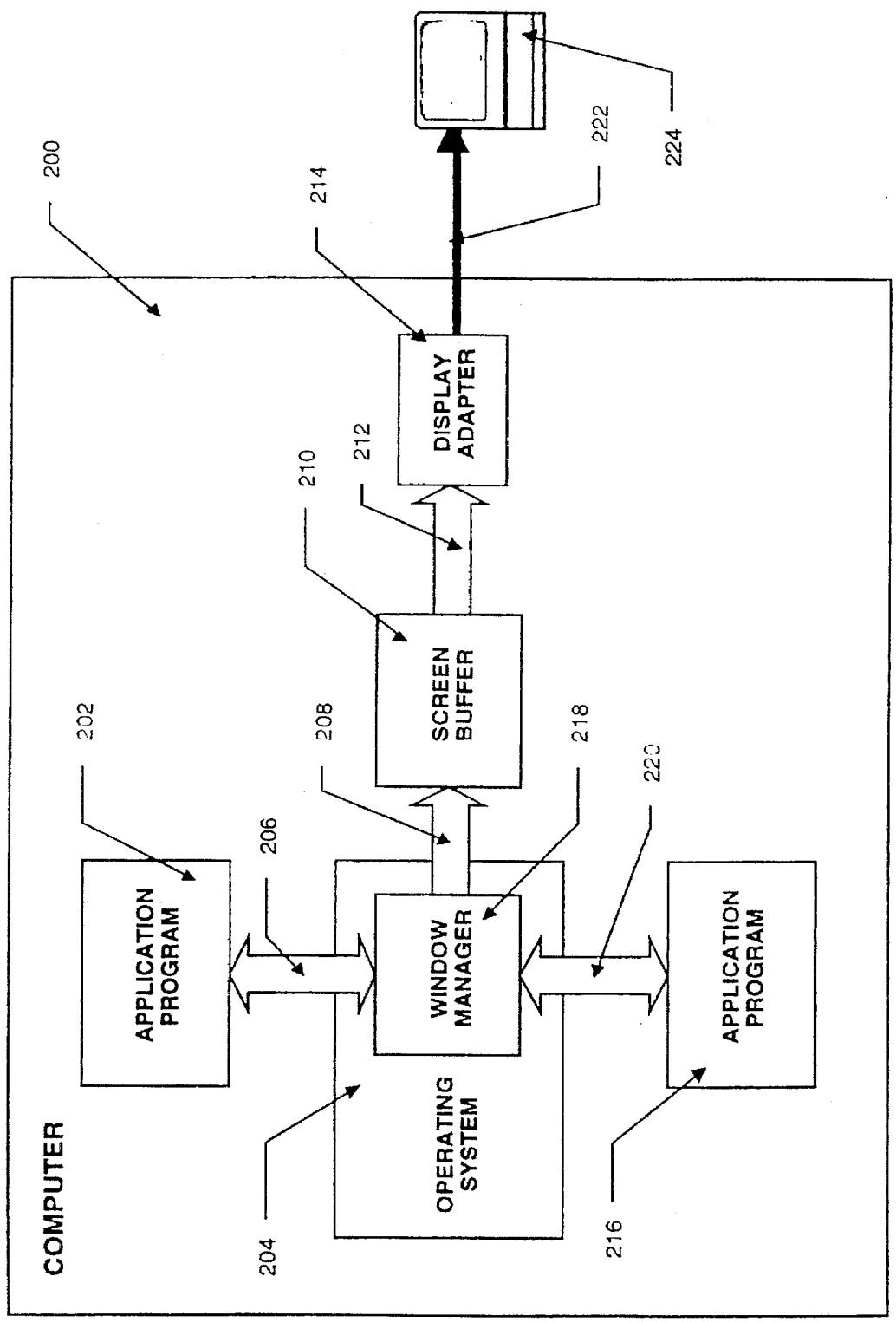
FIG. 2 is a schematic block diagram of a modification of the prior art system shown in FIG. 1 which allows several application programs running simultaneously to generate screen displays.
Figure 3:
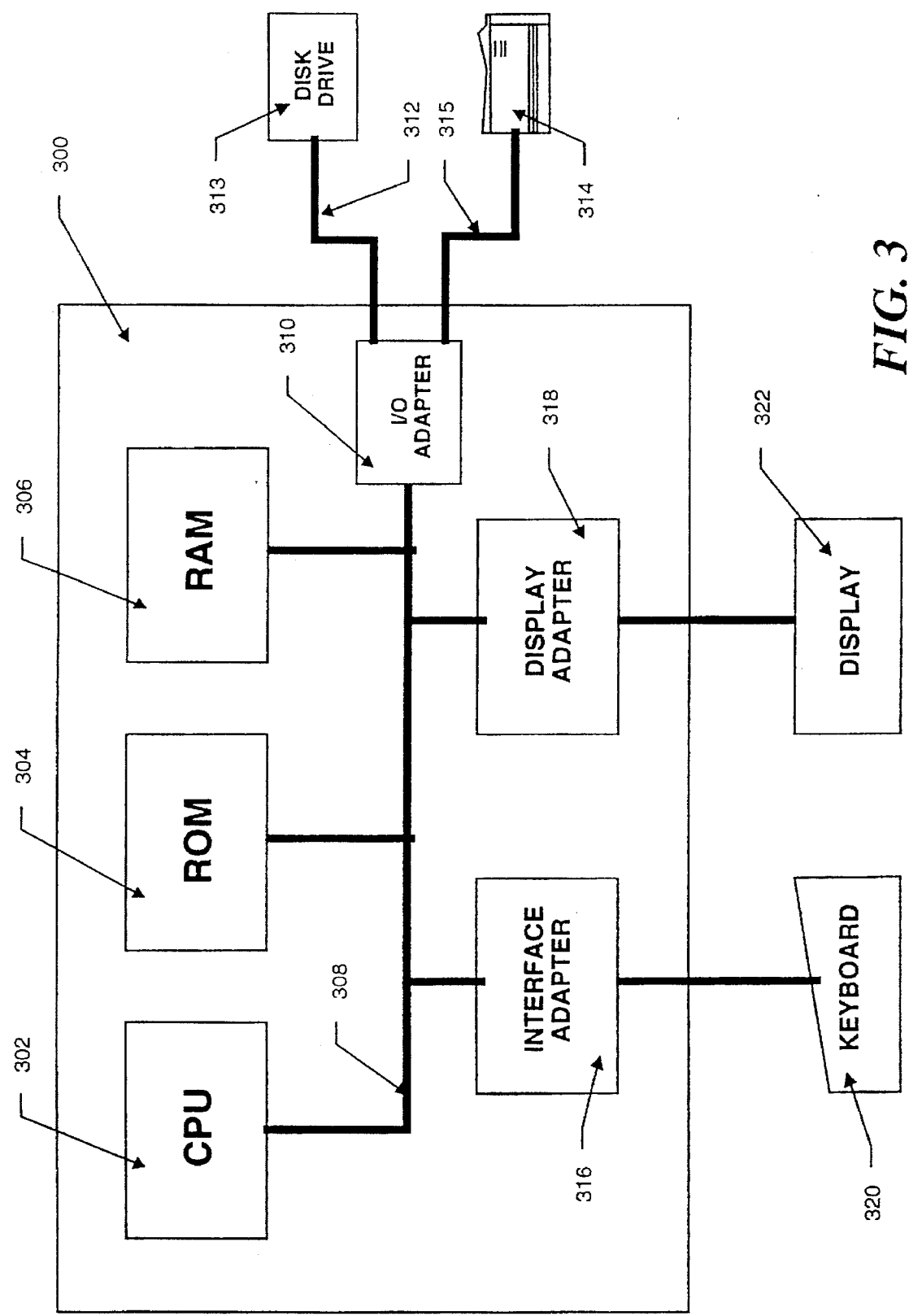
FIG. 3 is a block schematic diagram of a computer system for example, a personal computer system on which the inventive object oriented window manager operates.

The invention is preferably practiced in the context of an operating system resident on a personal computer such as the IBM, PS/2, or Apple, Macintosh, computer. A representative hardware environment is depicted in FIG. 3, which illustrates a typical hardware configuration of a computer 300 in accordance with the subject invention. The computer 300 is controlled by a central processing unit 302 (which may be a conventional microprocessor) and a number of other units, all interconnected via a system bus 308, are provided to accomplish specific tasks. Although a particular computer may only have some of the units illustrated in FIG. 3, or may have additional components not shown, most computers will include at least the units shown.

Specifically, computer 300 shown in FIG. 3 includes a random access memory (RAM) 306 for temporary storage of information, a read only memory (ROM) 304 for permanent storage of the computer's configuration and basic operating commands and an input/output (I/O) adapter 310 for connecting peripheral devices such as a disk unit 313 and printer 314 to the bus 308, via cables 315 and 312, respectively. A user interface adapter 316 is also provided for connecting input devices, such as a keyboard 320, and other known interface devices including mice, speakers and microphones to the bus 308. Visual output is provided by a display adapter 318 which connects the bus 308 to a display device 322, such as a video monitor. The workstation has resident thereon and is controlled and coordinated by operating system software such as the Apple System/7, operating system.

In a preferred embodiment, the invention is implemented in the C++ programming language using object-oriented programming techniques. C++ is a compiled language, that is, programs are written in a human-readable script and this script is then provided to another program called a compiler which generates a machine-readable numeric code that can be loaded into, and directly executed by, a computer. As described below, the C++ language has certain characteristics which allow a software developer to easily use programs written by others while still providing a great deal of control over the reuse of programs to prevent their destruction or improper use. The C++ language is well-known and many articles and texts are available which describe the language in detail. In addition, C++ compilers are commercially available from several vendors including Borland International, Inc. and Microsoft Corporation. Accordingly, for reasons of clarity, the details of the C++ language and the operation of the C++ compiler will not be discussed further in detail herein.

As will be understood by those skilled in the art, Object-Oriented Programming (OOP) techniques involve the definition, creation, use and destruction of "objects". These objects are software entities comprising data elements and routines, or functions, which manipulate the data elements. The data and related functions are treated by the software as an entity and can be created, used and deleted as if they were a single item. Together, the data and functions enable objects to model virtually any real-world entity in terms of its characteristics, which can be represented by the data elements, and its behavior, which can be represented by its data manipulation functions. In this way, objects can model concrete things like people and computers, and they can also model abstract concepts like numbers or geometrical designs.

Objects are defined by creating "classes" which are not objects themselves, but which act as templates that instruct the compiler how to construct the actual object. A class may, for example, specify the number and type of data variables and the steps involved in the functions which manipulate the data. An object is actually created in the program by means of a special function called a constructor which uses the corresponding class definition and additional information, such as arguments provided during object creation, to construct the object. Likewise objects are destroyed by a special function called a destructor. Objects may be used by using their data and invoking their functions.

The principle benefits of object-oriented programming techniques arise out of three basic principles; encapsulation, polymorphism and inheritance. More specifically, objects can be designed to hide, or encapsulate, all, or a portion of, the internal data structure and the internal functions. More particularly, during program design, a program developer can define objects in which all or some of the data variables and all or some of the related functions are considered "private" or for use only by the object itself. Other data or functions can be declared "public" or available for use by other programs. Access to the private variables by other programs can be controlled by defining public functions for an object which access the object's private data. The public functions form a controlled and consistent interface between the private data and the "outside" world. Any attempt to write program code which directly accesses the private variables causes the compiler to generate an error during program compilation which error stops the compilation process and prevents the program from being run.

Polymorphism is a concept which allows objects and functions which have the same overall format, but which work with different data, to function differently in order to produce consistent results. For example, an addition function may be defined as variable A plus variable B (A+B) and this same format can be used whether the A and B are numbers, characters or dollars and cents. However, the actual program code which performs the addition may differ widely depending on the type of variables that comprise A and B. Polymorphism allows three separate function definitions to be written, one for each type of variable (numbers, characters and dollars). After the functions have been defined, a program can later refer to the addition function by its common format (A+B) and, during compilation, the C++ compiler will determine which of the three functions is actually being used by examining the variable types. The compiler will then substitute the proper function code. Polymorphism allows similar functions which produce analogous results to be "grouped" in the program source code to produce a more logical and clear program flow.

The third principle which underlies object-oriented programming is inheritance, which allows program developers to easily reuse pre-existing programs and to avoid creating software from scratch. The principle of inheritance allows a software developer to declare classes (and the objects which are later created from them) as related. Specifically, classes may be designated as subclasses of other base classes. A subclass "inherits" and has access to all of the public functions of its base classes just as if these function appeared in the subclass. Alternatively, a subclass can override some or all of its inherited functions or may modify some or all of its inherited functions merely by defining a new function with the same form (overriding or modification does not alter the function in the base class, but merely modifies the use of the function in the subclass). The creation of a new subclass which has some of the functionality (with selective modification) of another class allows software developers to easily customize existing code to meet their particular needs.

Although object-oriented programming offers significant improvements over other programming concepts, program development still requires significant outlays of time and effort, especially if no pre-existing software programs are available for modification. Consequently, a prior art approach has been to provide a program developer with a set of pre-defined, interconnected classes which create a set of objects and additional miscellaneous routines that are all directed to performing commonly-encountered tasks in a particular environment. Such pre-defined classes and libraries are typically called "frameworks" and essentially provide a pre-fabricated structure for a working application.

For example, an framework for a user interface might provide a set of pre-defined graphic interface objects which create windows, scroll bars, menus, etc. and provide the support and "default" behavior for these graphic interface objects. Since frameworks are based on object-oriented techniques, the pre-defined classes can be used as base classes and the built-in default behavior can be inherited by developer-defined subclasses and either modified or overridden to allow developers to extend the framework and create customized solutions in a particular area of expertise. This object-oriented approach provides a major advantage over traditional programming since the programmer is not changing the original program, but rather extending the capabilities of the original program. In addition, developers are not blindly working through layers of code because the framework provides architectural guidance and modeling and, at the same time, frees the developers to supply specific actions unique to the problem domain.

There are many kinds of frameworks available, depending on the level of the system involved and the kind of problem to be solved. The types of frameworks range from high-level application frameworks that assist in developing a user interface, to lower-level frameworks that provide basic system software services such as communications, printing, file systems support, graphics, etc. Commercial examples of application frameworks include MacApp (Apple), Bedrock (Symantec), OWL (Borland), NeXT Step App Kit (NEXT), and Smalltalk-80 MVC (ParcPlace).

While the framework approach utilizes all the principles of encapsulation, polymorphism, and inheritance in the object layer, and is a substantial improvement over other programming techniques, there are difficulties which arise. Application frameworks generally consist of one or more object "layers" on top of a monolithic operating system and even with the flexibility of the object layer, it is still often necessary to directly interact with the underlying operating system by means of awkward procedural calls.

In the same way that an application framework provides the developer with prefab functionality for an application program, a system framework, such as that included in a preferred embodiment, can provide a prefab functionality for system level services which developers can modify or override to create customized solutions, thereby avoiding the awkward procedural calls necessary with the prior art application frameworks programs. For example, consider a display framework which could provide the foundation for creating, deleting and manipulating windows to display information generated by an application program. An application software developer who needed these capabilities would ordinarily have to write specific routines to provide them. To do this with a framework, the developer only needs to supply the characteristics and behavior of the finished display, while the framework provides the actual routines which perform the tasks.

A preferred embodiment takes the concept of frameworks and applies it throughout the entire system, including the application and the operating system. For the commercial or corporate developer, systems integrator, or OEM, this means all of the advantages that have been illustrated for a framework such as MacApp can be leveraged not only at the application level for such things as text and user interfaces, but also at the system level, for services such as printing, graphics, multi-media, file systems, I/O, testing, etc.

Figure 4:
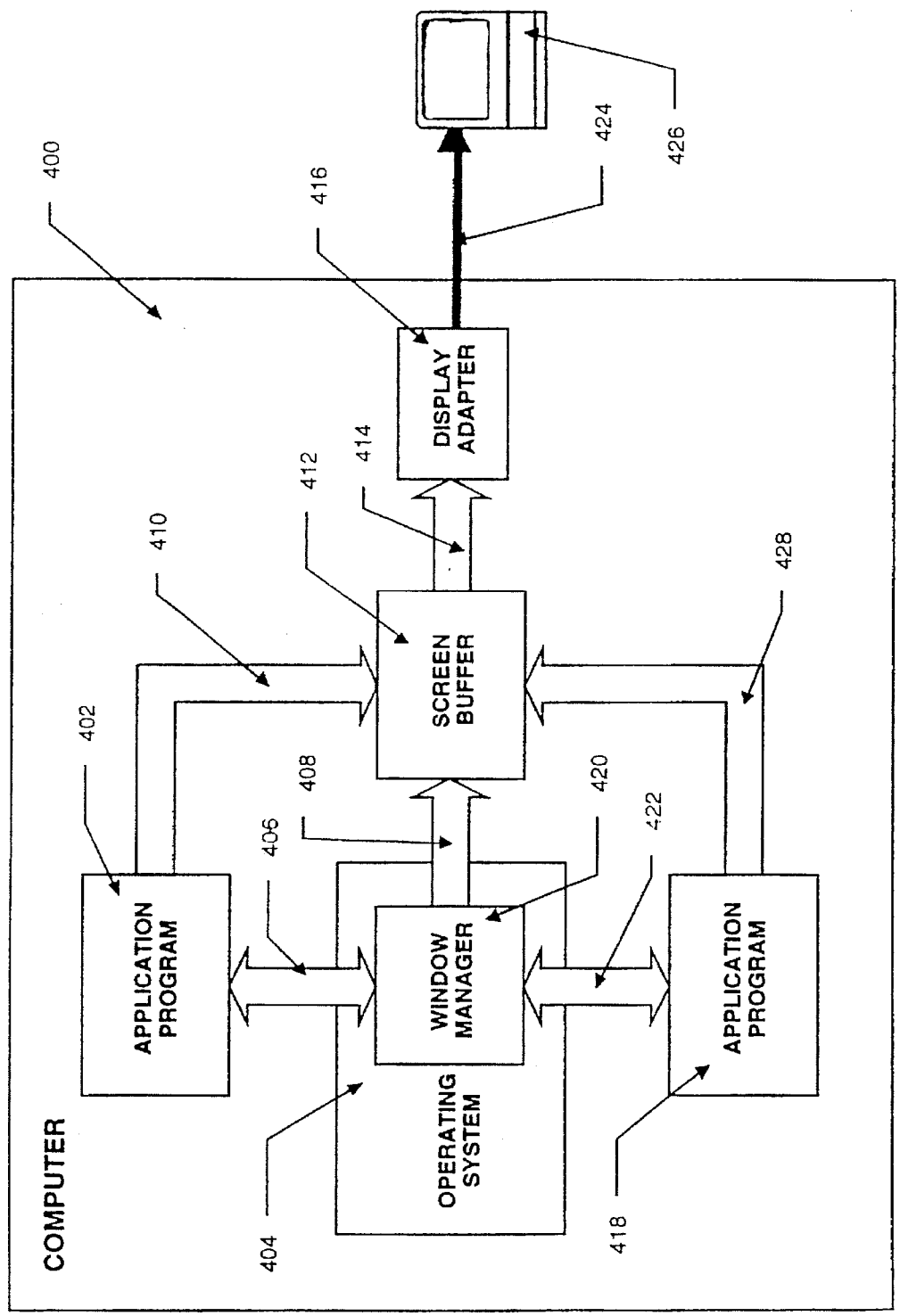
FIG. 4 is a schematic block diagram of a modified computer system showing the interaction between a plurality of application programs and the window manager in screen buffer in order to display graphic information on the display monitor.

FIG. 4 shows a schematic overview of a computer system utilizing the object-oriented window manager of the present invention. The computer system is shown generally as dotted box 400 and several application programs (of which application programs 402 and 418 are shown) and an operating system 404 are provided to control and coordinate the operations of the computer. In order to simplify FIG. 4, the interaction of the application programs 402 and 418 with the operating system 404 is limited to the interactions dealing with the screen displays. As shown in the figure, both application programs 402 and 418 interface with the window manager portion 420 of the operating system 404. The window manager 420, in turn, sends information to the screen buffer 412 as schematically illustrated by arrow 408.

However, in accordance with the invention, and, as shown in FIG. 4, application programs 402 and 418 also directly send information to the screen buffer 412 as illustrated by arrows 410 and 428. As will hereinafter be explained in detail, application programs 402 and 418 provide display information directly to the window 420 and retrieve stored information from window manager 420 when a window display is changed. More specifically, when a window is changed, window manager 420 recomputes and stores the visible area of each window. This stored visible area is retrieved by the respective application program and used as a clipping region into which the application draws the display information. Repainting or drawing of the windows is performed simultaneously by the application programs in order to increase the screen repainting speed.

The application displays are kept separated on the display screen because the window manager 420 recomputes the window visible areas so that none of the areas overlap. Thus, if each application program, such as application program 402 or application program 418 draws only in the visible area provided to it by the window manager 420, there will be no overlap in the displays produced by the screen buffer. Once the display information is drawn into the screen buffer 412 it is provided, as indicated by arrow 414, to a display adapter 416 which is, in turn, connected by cable, or bus, 424 to the display monitor 426.

Figure 5:
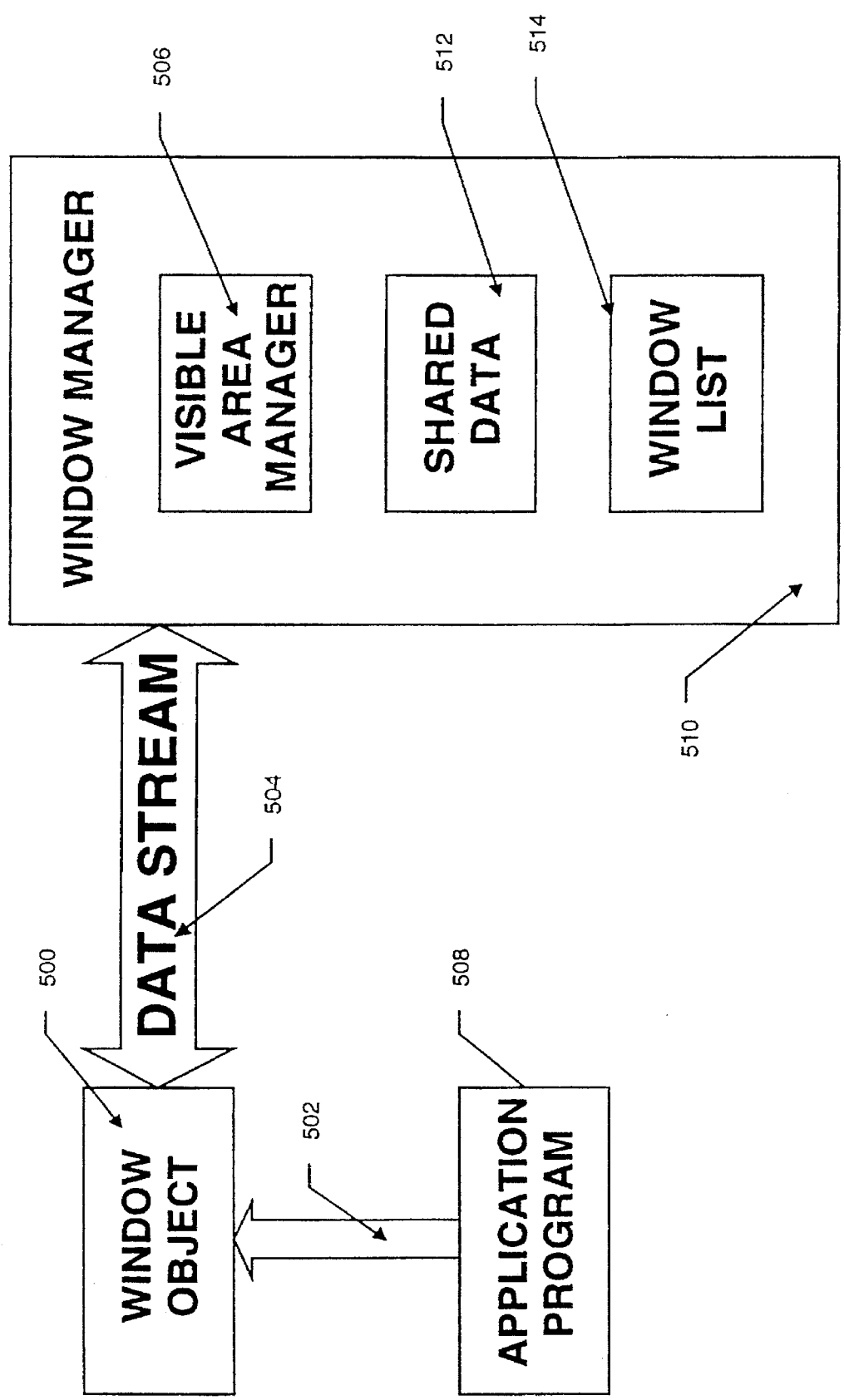
FIG. 5 is a block schematic diagram of the information paths which indicate the manner in which an application program communicates with the inventive object oriented manager.

The interaction of an application program with the window manager is illustrated in more detail in schematic diagram FIG. 5. As previously mentioned, the window manager (illustrated as box 510 in FIG. 5) is an object-oriented program. Accordingly, an application program 508 interfaces with the window manager by creating and manipulating "objects". In particular, each application program creates a window object, for example, window object 500 in order to communicate with window manager 510. The application program 508 then communicates with the window object 500 as shown schematically by arrow 502. The window manager itself is an object which is created when the operating system is started and creation of a window object causes the window manager 510 to create an associated window on the display screen.

Since many window objects may be created simultaneously in order to simultaneously display many windows on the display screen, each window object 500 communicates with the window manager 510 by means of a data stream 504. Data stream 504 is created by creating "stream" objects which contain the software commands necessary to transfer information from one object to another. For example, when window object 500 desires to transfer information to window manager object 510, window object 500 creates a stream object which "streams" the data into window manager object 510. Similarly, when window manager object 510 desires to transfer information back to window object 500, window manager object 510 creates a stream object which "streams" the data into window object 500. Such stream objects are conventional in nature and not described in detail herein. The stream objects which carry data from window object 500 to window manager object 510 and the stream objects which carry information from window manager object 510 to window object 500 are illustrated collectively as arrow 504.

As shown in FIG. 5, window manager object 510 consists of three main parts: the visible area manager 506, the shared data area 512 and the window list 514. The visible area manager 506 is an independent task which is started by the window manager 510 when the window manager 510 is created. As will be hereinafter explained in detail, the visible area manager is responsible for managing the portions of the window which are visible on the data display screen. To this end, it recomputes a window's visible area when either a window, or another window located in "front" of the window is changed. It also performs a number of other housekeeping tasks, such as the repair of desktop "damage" which occurs when windows are reoriented or resized and expose previously-covered areas of the underlying "desktop".

The shared data area 512 comprises an area in shared memory and associated storage and retrieval routines which together store information related to the windows. The shared data area is created by the window manager in shared memory and a portion of the shared data area is assigned to each of the windows and contains various window parameters including a "time stamp" indicating the version of the visible area.

In order to reduce the use of a message stream to access the visible area, each window object 500 also maintains a local "cache" memory which stores a copy of the visible area of the associated window. A time stamp is also stored in the local cache memory, which time stamp indicates the last version of the visible area that was retrieved from the Window Server. When an application program begins a redrawing operation, it requests the visible area from the window object. The window object, in turn, retrieves a time stamp from the shared memory area and compares the retrieved time stamp to the time stamp stored in the local cache memory. If the comparison of the two time stamps indicates that the visible area was not modified, then the copy of the visible area stored in the local cache memory is used for the redrawing operation. Alternatively, if the time stamp comparison indicates that the window manager has updated the visible area, then a new visible area must be retrieved and stored in the local cache area. The retrieval of the time stamp alone is much faster than the retrieval of the entire visible area so that the overall redrawing time is reduced if the local cached copy can be used.

Window manager 510 also maintains a window list 514 which is illustratively implemented as a linked list that contains an identification number for each window currently in the system. In accordance with a preferred embodiment of the invention, each window is assigned a window "kind". Window kinds are selected from a kind hierarchy which generally follows the relative positioning of the windows on the screen. An illustrative kind hierarchy is as follows (window kinds are illustrated starting with the window kind which normally appears in the foremost window position):

Foremost Position: screen saver, menu bar, menu, windoid (intended for floating palettes and other similar type of window), and document. Rearmost Position: desktop.

The window manager automatically maintains the windows displayed on the screen in a manner such that windows of a similar kind are all positioned together in a kind "layer". This positioning is accomplished by inserting "place holders" in the window list indicating divisions between kind layers. The window manager can then iterate through the window list until it reaches one of these place holders to determine when the end of a particular kind layer has been reached in the start of a new kind layer begins.

As previously mentioned, in accordance with a preferred embodiment, the operating system is capable of running multiple tasks simultaneously and, whenever two or more tasks are operating simultaneously, there is a potential for mutual interaction. Such mutual interaction can occur when two or more tasks attempt to access simultaneously shared resources, such as the shared data area or the window list. Accordingly, concurrency controls are necessary to manage such interactions and to prevent unwanted interference. An illustrative concurrency control technique known as a semaphore is used in one embodiment. Semaphores are well-known devices which are used to "serialize" concurrent access attempts to a resource. In particular, before a task can access a resource which is controlled a semaphore, the task must "acquire" the semaphore. When the task is finished with the resource it releases the semaphore for acquisition by another task. Each semaphore generally has a request queue associated with it so that requests to acquire the semaphore which cannot be honored (because the semaphore has been acquired by another task) are held on the queue.

In the present system, semaphores are used to protect several different shared resources. In particular, a global drawing semaphore is used to prevent the application programs from interacting with the window manager. Before accessing the visible area, each application program must acquire the drawing semaphore. The drawing semaphore used in the present system has two modes: a shared mode and an exclusive mode. In accordance with the invention, application programs may write in the screen buffer simultaneously with other application programs and therefore must acquire the drawing semaphore in the "shared" mode. Since the application programs are kept separate in the screen buffer by the window manager, this simultaneous access does not present a problem. However, the window manager performs operations, such as creating a new window, which can affect all windows and, thus, the window manager must acquire the drawing semaphore in the "exclusive" mode. When the window manager has acquired the drawing semaphore exclusively, the applications cannot acquire the semaphore and thus cannot write in the screen buffer. This exclusive operation prevents the applications from overwriting changed portions of the screen buffer before they have been informed of the changes.

In a similar manner, global semaphores are used to protect the shared data area 512 in the window manager 510 which shared area is also a shared resource. A similar local semaphore is used to protect the window list 514 from simultaneous access by different application programs using the Window Server. The specific acquisition and release of the various semaphores will be discussed in further detail herein when the actual routines used by the programs are discussed in detail.

The Window Server, which may also be referred to as a layer server, is used to allocate and manage screen real-estate for all running programs. The Window Server in accordance with the present invention performs numerous functions in addition to traditional Window Server functions. The functions include: recovery from tasks that die while holding a drawing semaphore; user reconfiguration of the display (changing bit depths, monitor positions) while the operating system is running; programmer access to the desktop geometry; hardware windows, e.g. allowing windows to be accelerated by hardware; use notification instead of events for updates and activate/deactivate; incorporate management of display devices.

Figure 6:
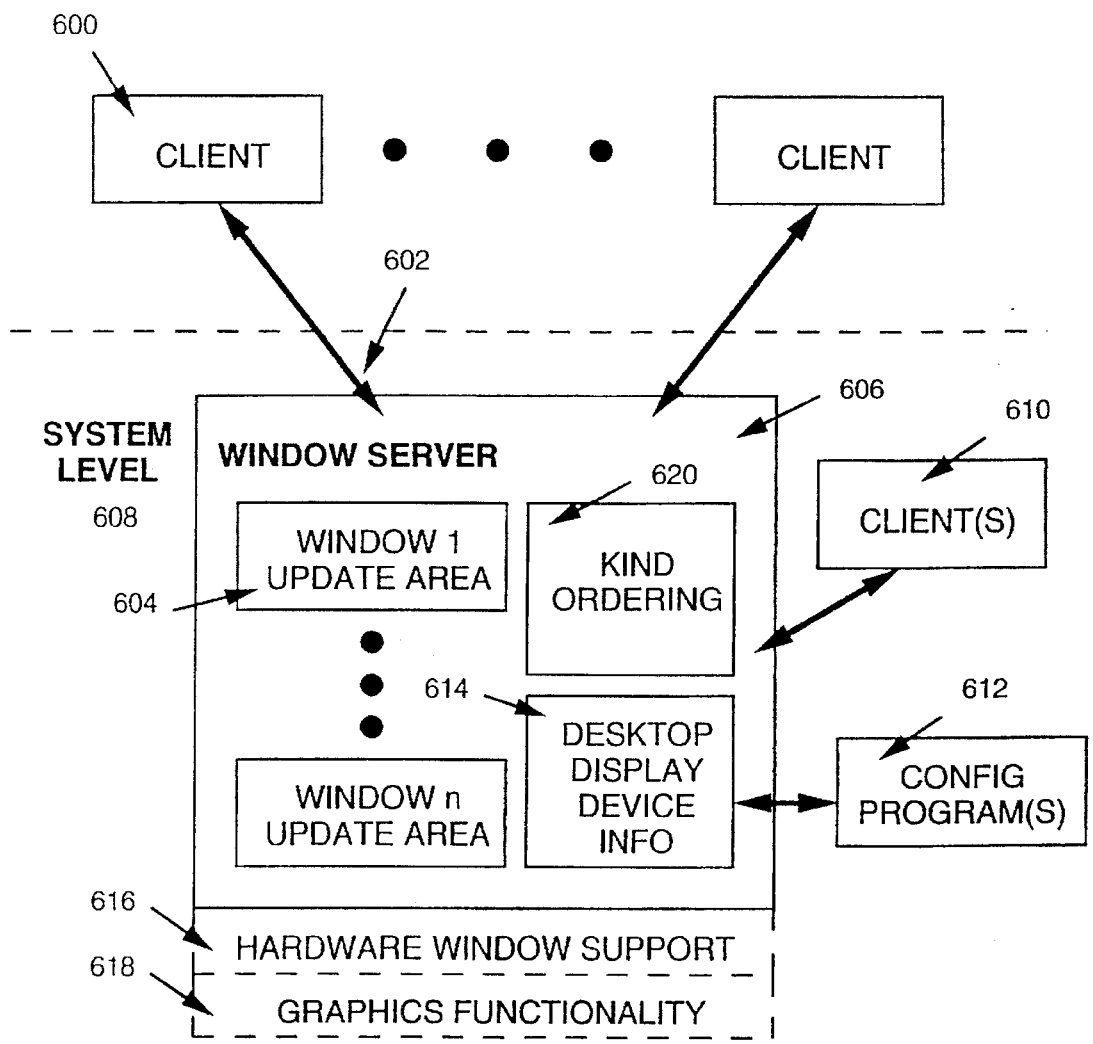
FIG. 6 is a block diagram showing the system level Window Server, and the relation between the Window Server and the Clients.

FIG. 6 shows the Window Server 606 at system level 608. The Window Server 606 is privately used by a variety of Clients 600 and 610 within the computer system. Seldom would there be a need for a programmer to deal with the Window Server 606. For example, the objects and portions of the system which create and manipulate windows could be considered a Client of the Window Server 606. Another example would be such entities as the document level window manager; personalities, such as a Mac or OS/2 adapter (to create and manipulate windows); configuration models (to reconfigure displays); and the graphics system (to query and manipulate display devices).

In addition, the Window Server 606 can be extended by display device driver writers. For example, the Window Server 606 can be extended to implement hardware windows 616, if the hardware supports them, and to add graphics functionality 618. The extensions are shown in phantom broken lines in FIG. 6 to denote that they are extensions of the Window Server 606.

The Window Server 606 is an object-oriented system which divides available screen area among all running programs. There may also be window managers at other levels which use the system level window manager. For example, the system may include a document-level window manager which manages the screen space within a document's window.

Window server Clients 600 and 610 create windows that have a certain bounds (an arbitrary area). The Clients may be system level 610 or non-system level 600. Based on the ordering of windows and how they overlap, the Window Server 606 can determine the visible part of each window. Clients are expected to restrict drawing to this area.

To support special user interface features (e.g., floating windows), the Window Server 606 defines a number of window kinds, as indicated by 620. These kinds are ordered and the Window Server 606 ensures that all the windows of one kind are in front of all windows of the following kinds. The full set of kinds is described below, but it includes things like menu bar, windoid, document, and desktop.

The Window Server 606 also maintains an update area 604 for each window, which describes the part of the window that has been "damaged" due to window manipulations. (Damage that is caused within the document itself is managed by the document window manager. For example, the document window manager manages damage caused by view manipulation, invalidation, etc.) The Window Server 606 notifies the Client 600 (such as the document window manager), as shown by 602, when one of its window's update areas becomes non-empty. It also will erase the damaged parts of windows, which can be partially controlled by Clients (such as the document window manager) on a window-by-window basis.

The Window Server 606 also notifies Clients, shown by 602, (such as the document window manager) when a window is activated or deactivated. The front-most window is the active window, all others are deactivated.

The Window Server 606 also maintains information about the display devices that make up the desktop in Desktop Display Device Info 614. Configuration Programs 612 can query and modify this information to change bit depth, monitor positioning, and other hardware specific attributes of the displays.

The following discussion refers to objects using object names preceded by a capital "T." For example, the system window object is referred to as TSystem Window.

Client Classes

Certain classes allow Clients to create, destroy, and manipulate windows. For example:

1. TSystemWindow creates a new window. Instantiating the object creates the window; deleting the object destroys the window.

2. TSystemWindowSurrogate acts like just like TSystemWindow, except destroying the surrogate has no effect on the real window.

Figure 7:
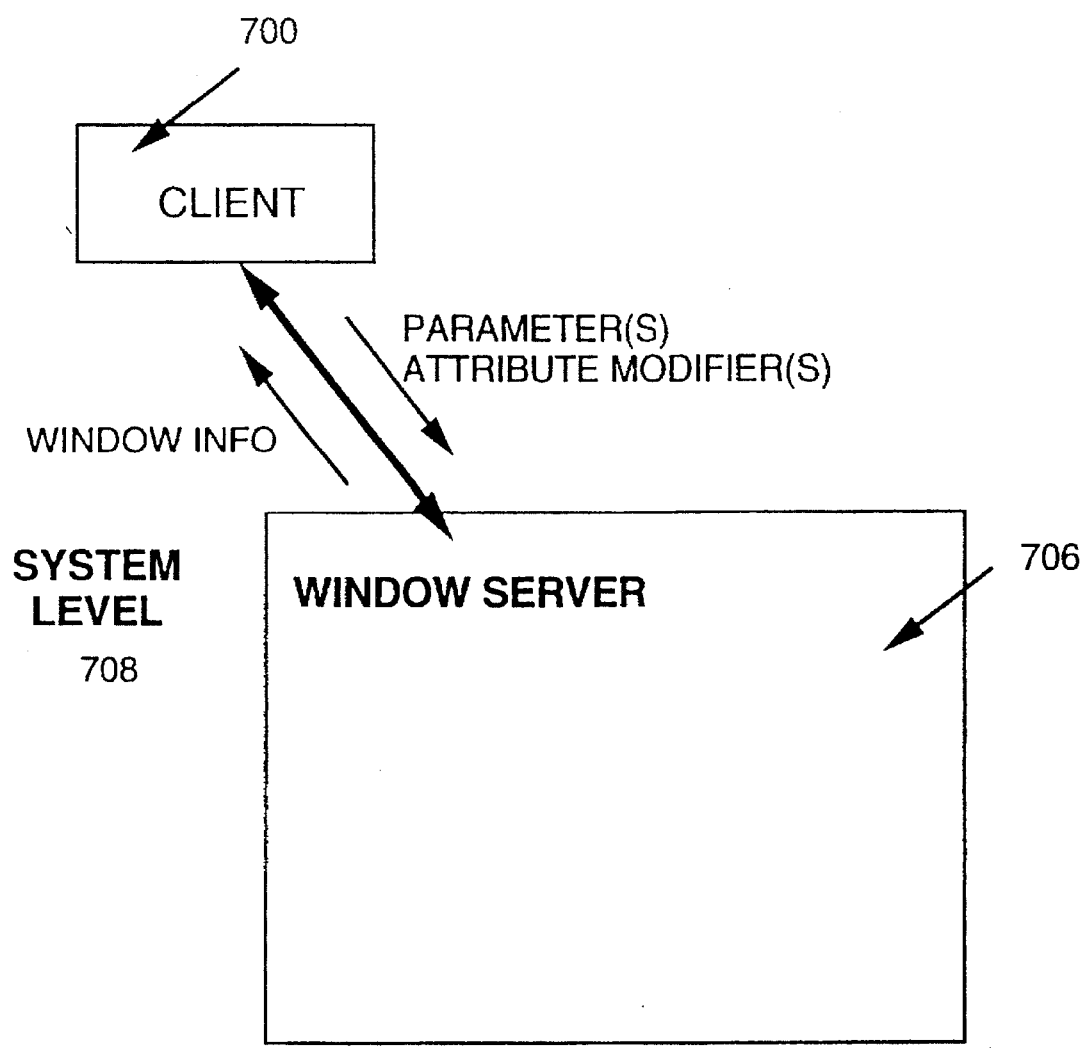
FIG. 7 is a block diagram demonstrating the elements and operations involved with parameter passing from a Client to the Window Server in order to create a window.

FIG. 7 shows window creation. To create a window, the Client 700 (the document window manager or a personality) creates a TSystemWindow, passing in to the Window Server 706 at the system level 708 the following parameters: the extent (position and shape) of the window (expressed as an area object in world coordinates); an event receiver ID to identify the task that receives events and notification for the window; the front-to-back ordering of the window; whether the window should be visible initially; whether the Window Server should automatically erase damaged parts of the window; and the kind of window.

The Window Server supports a basic set of operations on a window. Clients can obtain information about a window, including its event receiver ID, its current update area, and its current visible area as shown in FIG. 7 by the arrow from the Window Server 706 to the Client 700. In addition, Clients can modify at-tributes of the window - they can change the extent of the window, hide or show the window, and bring the window to the front of other windows of the same kind, as indicated by the arrow from Client 700 to Window Server 706.

Figure 8:
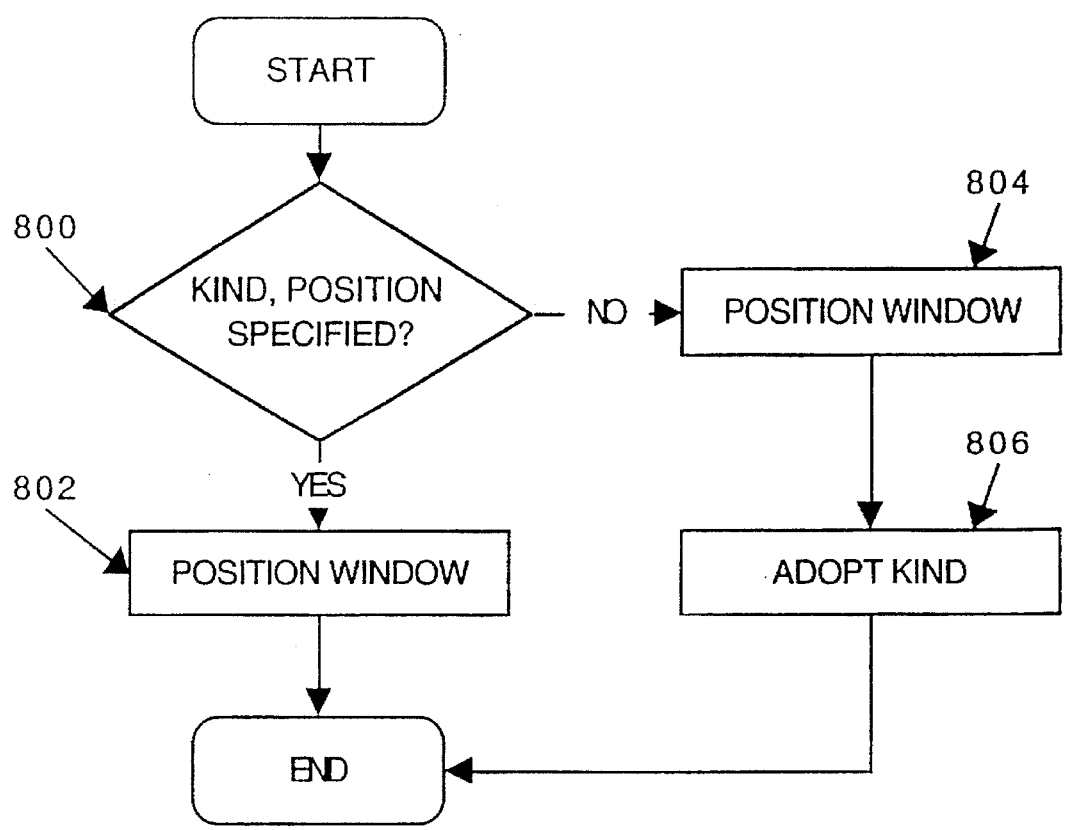
FIG. 8 is a flowchart describing how a window is positioned by the Window Server in response to specification of window kind and position by the Client.

FIG. 8 is a flowchart which demonstrates how a window is positioned by the window manager in response to information from the Client. There are two ways to specify the window positioning, each having its own constructor. First, the Client can specify the window's kind and whether it should be the frontmost or backmost window of that kind. The determination as to whether this information is given is indicated by the decision at 800. If kind and position are specified, the window is positioned 802. Second, if the kind has not been specified, the new window can be positioned 804 immediately in front of or behind an existing window (thereby adopting its kind 806).

Subclasses of TSystemWindow can be used to create hardware-specific windows. This will be discussed in depth in the Hardware Windows section below.

When a window is changed, the Window Server recomputes its visible area, (possibly) adding to the window's update area. It also sends notification to Clients when a window needs updating or when the active state of a window changes. Each window maintains a time stamp that indicates the current "version" of its visible area. Clients can use this to detect when a window's visible area changes, and perform incremental updates based on the current visible area and the old area.

All the operations on a window are available in the TSystemWindow class and the nearly identical TSystemWindowSurrogate class. The difference between the two classes is that there is a one-to-one mapping between "physical" windows and TSystemWindow instances. Creating the object creates the window; deleting the object destroys the window. This means that TSystemWindow instances cannot be copied or passed to other tasks. Instances of TSystemWindowSurrogate can be copied and passed around, and can be changed to refer to other windows. Deleting a TSystemWindowSurrogate object has no effect on the existence of the window on the screen.

TSystemWindow class can implement global window functions through a number of static member functions. For example, it is possible to get the window containing a particular screen point and process a mouse click, or to stop and start system drawing.

The window sends events to an application when a window becomes active or inactive, and when a window needs to be updated because it is damaged. The primary Client for this service is the document window manager.

Instead of posting events, the window uses notification. TSystemWindow and TSystemWindowSurrogate can be notifiers.

Figure 9:
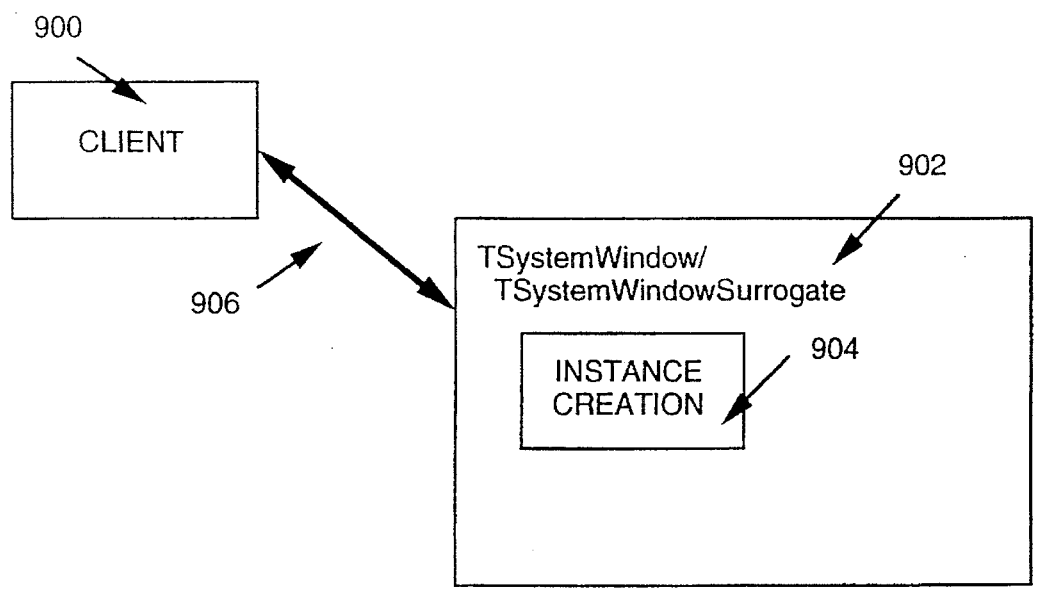
FIG. 9 is a block diagram demonstrating how a Client interacts with window objects to create notification instances.

A shown in FIG. 9, Client 900 can ask, as indicated by 906, either of these classes 902 to create interests, via Instance Creation 904, for

| | |
|---|---|
| ActivateWindow | This window has become active. |
| DeactivateWindow | Another window has become active. |
| WindowUpdate | This window is damaged and must be redrawn. |

Window activation notification is not necessarily synchronous with events being received by a document. For example, if the user clicks on an inactive window and then starts typing, mouse and key events may be delivered to the document prior to the activate notification. The benefits of using notification vs. events for activation are 1) better performance, and 2) an easier programming model, which results in more maintainable code.

Figure 10:
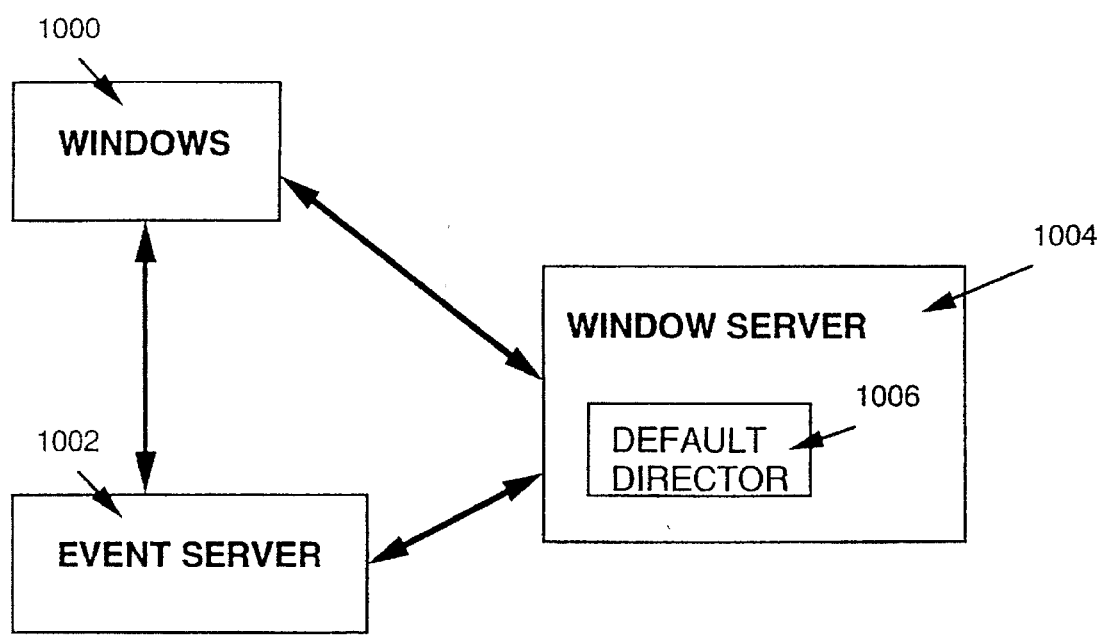
FIG. 10 is a block diagram which shows the interactions between windows, the Window Server, and event server in a preferred embodiment of the present invention.

FIG. 10 is a block diagram which shows the interactions between windows, the Window Server 1004, and Event Server 1002 in a preferred embodiment of the present invention. The Window Server 1004 maintains which window receives default events (e.g. keystrokes) using a default director 1006. The window which receives default events is always the frontmost (unless the document window manager specified that the window could not receive default events).

The determination of who should receive default events is performed by an event server 1002. One of the windows 1000 will notify the event server 1002 (using a Client class) each time a new window becomes frontmost. The Window Server will pass the event receiver ID of the window to the event server. The event server will use this information to determine who should get default events.

The window provides a drawing semaphore which protects access to the set of window visible areas. Before modifying any visible area, the window acquires this semaphore. Before drawing into a visible area, a Client must acquire this semaphore in shared mode.

The effect of this convention is that when the window needs to modify any visible area it blocks until all the current drawing operations finish. New drawing operations are not allowed to begin until the window is done. This insures that when a Client draws, the visible area is indeed correct. Because a Client's drawing is clipped to the visible area by the document window manager, this insures that a Client won't draw into a part of the screen not assigned to it.

One problem that may be encountered is that a Client task may die while holding the drawing semaphore. System kernels do not release semaphores held by dead tasks. The result is disastrous because all drawing deadlocks, which looks like a completely hung system to the end user. This situation is remedied in a preferred embodiment by adding a recoverable semaphore (TRecoverableSemaphore) to the system kernel. When a task dies that is holding this semaphore, the kernel automatically releases TSystemWindow and TSystemWindowSurrogate have member functions to allow Clients access to this semaphore. These member functions include the ability to acquire, release, and wait for semaphores.

Figure 11:
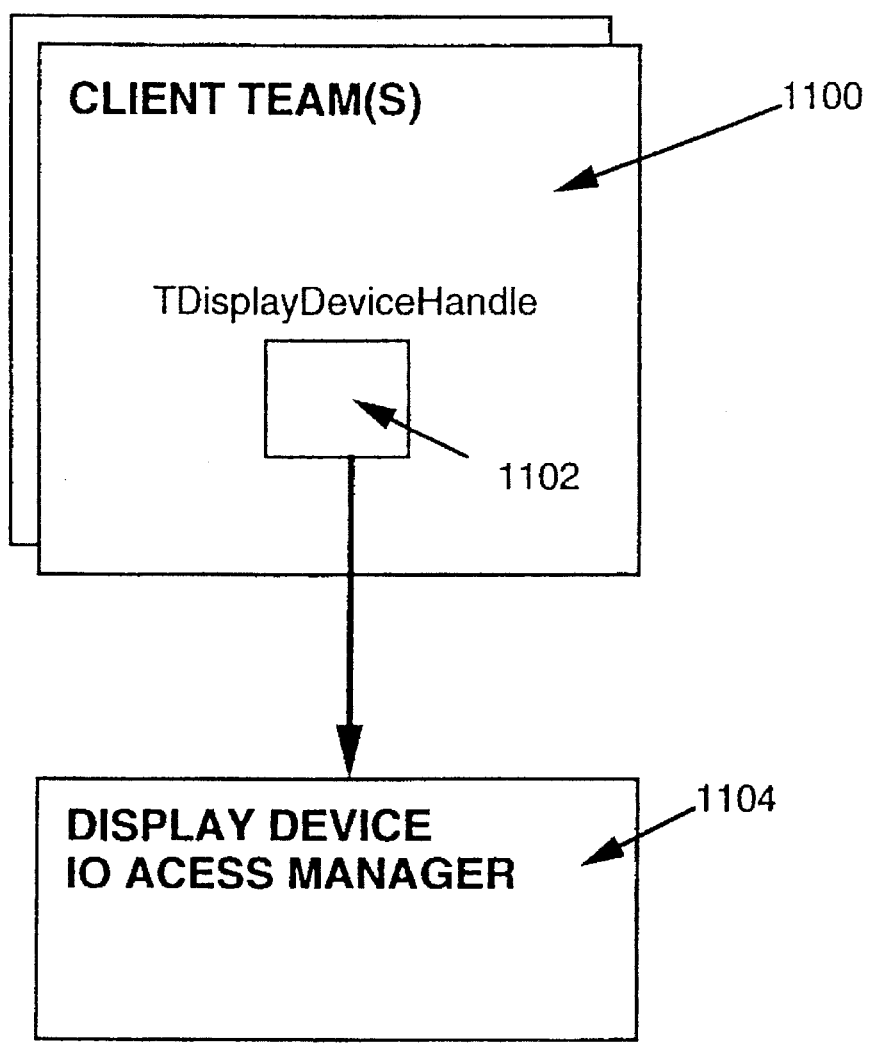
FIG. 11 is a block diagram demonstrating that for each display device that makes up the desktop, there is an IO access manager.

FIG. 11 is a block diagram demonstrating that for each display device that makes up the desktop, there is an IO access manager 1104. There may be one or more Client teams 1100 which have IO access managers. TDisplayDeviceHandles 1102 are Client objects used to communicate with the display device.

Display device IO access managers 1104 are responsible for maintaining and manipulating the state of the hardware display device, such as monitor bit depth and position. Display device handles are used by configuration programs to change these attributes.

Display device driver writers must subclass TDisplayDeviceHandle to support the capabilities provided by their hardware. If a card performs a unique function, such as video overlay with chroma keying, for example, the subclasser would add member functions to TDisplayDeviceHandle to allow Clients to access this feature.

Configuration programs need to stop all drawing prior to reconfiguring the screen. Bit depth and monitor position are examples of things that the user can reconfigure.

Figure 12:
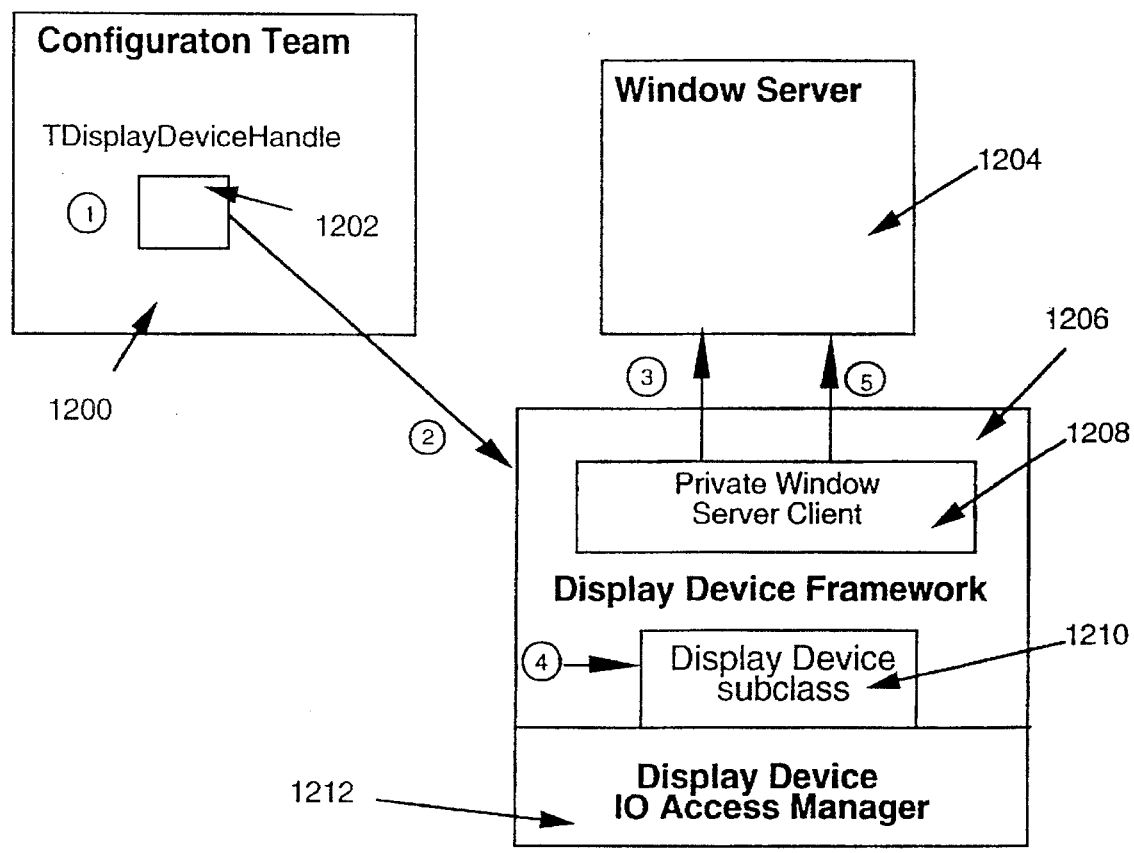
FIG. 12 shows the elements and flow of operations between configuration teams, the display device framework, the Window Server, and display device access manager.

FIG. 12 shows the elements and flow of operations between Configuration Teams 1200, the Display Device Framework 1206, the Window Server 1204, and Display Device Access Manager 1212. The steps outlined below correspond to the circled numbers of FIG. 12.

1) Configuration team 1200 calls member function of TDisplayDeviceHandle 1202 to request a reconfiguration.
2) This request is sent to the Display Device IO Access Manager 1212.
3) The Display Device Framework 1206 intercepts the request. Recognizing it as a configuration update request, the framework sends a request to the window handled by the Window Server 1204 (via a private Window Client 1208) to stop all drawing.
4) When all drawing has been stopped, the Display Device Framework 1206 dispatches the request, causing the subclass 1210 to perform the reconfiguration.
5) When the subclass completes the reconfiguration, the Display Device Framework 1206 tells the window to resume drawing. The window will force the affected screen area to be redrawn by sending update notification to the windows on the display. The window also changes a graf device seed, which is used by the document window manager to notice that a new graf device must be obtained.

TDesktopDisplay, described in the next section, can be used if an application is interested in knowing exactly how the monitor configuration has changed.

Access To Desktop Geometry

Many applications will need access to the geometry of the desktop—a TGArea for the desktop as a whole and a TGArea for each screen that makes up the desktop. A few examples of which Clients may use such a feature is as follows:

The document framework needs to allow a zoomed window to take up an entire screen. To do this, it needs to know the size of the screen.

Documents will need to force a window that was previously displayed on a much larger desktop (say, on a 21" monitor) to be visible on a smaller screen (such as a 9" monitor).

The cursor code needs to know the desktop geometry so it can pin the cursor to the screen.

Figure 13:
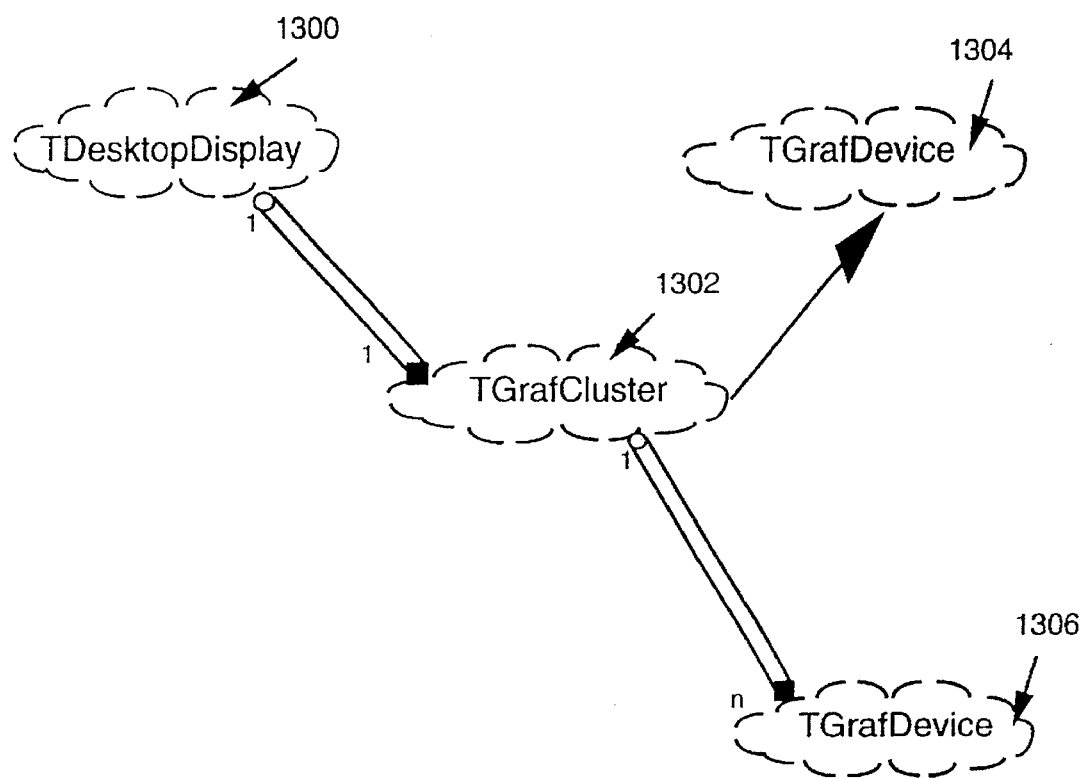
FIG. 13 shows the classes used for accessing the desktop geometry.

FIG. 13 is a Booch diagram showing the classes used for accessing the desktop geometry. TDesktopDisplay 1300 is an object which represents the entire desktop, and has notification of bit depth changes and monitor position changes. TDesktopDisplay 1300 represents all of the displays that make up the desktop. It has a TGrafCluster 1302, which is the rendering object for all displays. TGrafCluster 1302 is a collection of all of the rendering objects that make up the desktop. TGrafCluster has a member function for iterating through all component graf devices as well as a member function to get the desktop geometry as an area. A Client can ask a desktop display for its graf cluster. TGrafDevice 1304 is a rendering object. TGrafDevice 1306 represents subclasses for each individual display. These subclasses also mix in MScreenDevice, which is discussed further below.

Figure 14:
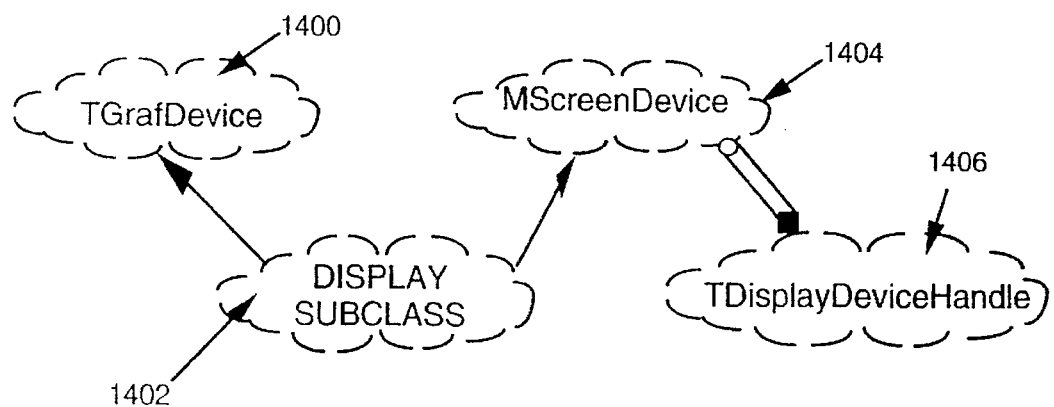
FIG. 14 is a Booch diagram depicting how each component graf device is represented by a subclass of TGrafDevice and MScreenDevice.

FIG. 14 is a Booch diagram depicting how each component graf device is represented by a subclass of TGrafDevice and MScreenDevice. MScreenDevice 1404 adds compositing, sprite, and multitask synchronization functions to TGrafDevice. TDisplayDeviceHandle 1406 makes queries upon the actual display device. Display Subclass object 1402 comprise subclasses that represent the display. TGrafDevice 1400 has been described above. The geometry of the display can be obtained by first asking the MScreenDevice 1404 for it's display device handle. TDesktopDisplay can also send notification when certain conditions occur. For example, when the geometry has changed, or when the user has repositioned the monitor the TDesktopDisplay can send notifications.

Hardware Windows

The preferred embodiment supports hardware windows by using polymorphic screen device objects to allocate, move and resize windows. Whether the window is drawn by software or hardware does not matter to the Window Server.

The window can accommodate display devices that implement window functionality in hardware. Hardware is often used to accelerate window repainting when moving windows, visible area calculations for windows, and update area calculations for windows.

Internal Windows

Figure 15:
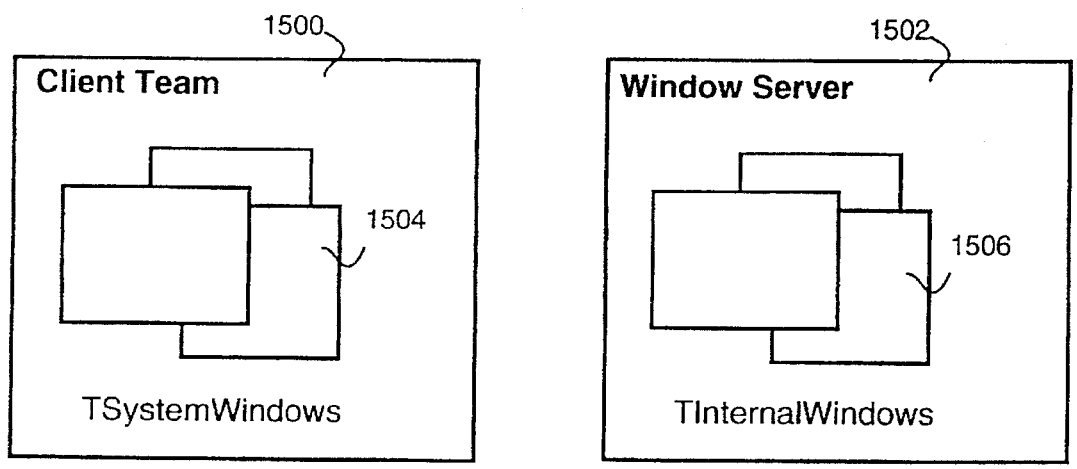
FIG. 15 is a block diagram showing the windows of a Client team, and the windows of the Window Server.

FIG. 15 is a block diagram showing the windows of a Client Team 1500, and the windows of the Window Server 1502. The Window Server uses the class TInternalWindow 1506 to internally represent a piece of screen real-estate in the Window Server 1502. Whenever a Client Team 1500, such as the document window manager, creates a TSystemWindow 1504, a TInternalWindow 1506 is created inside the window.

Figure 16:
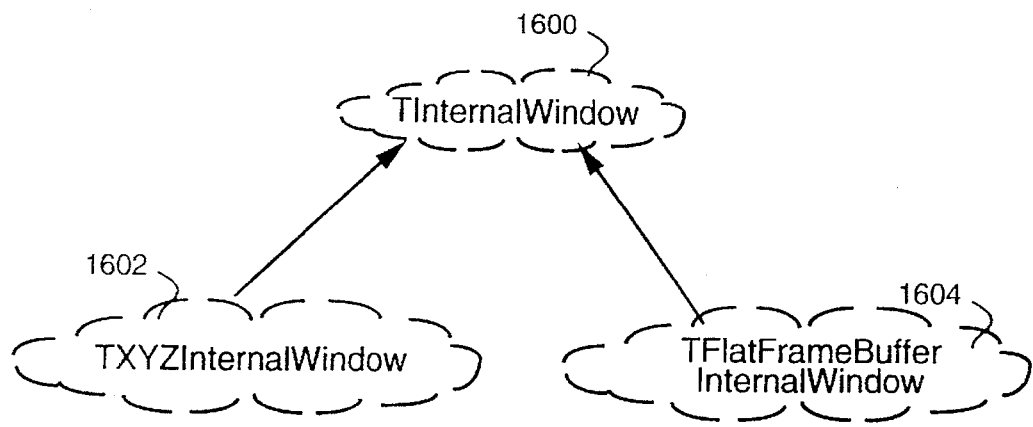
FIG. 16 is a Booch diagram demonstrating TInternalWindow being subclassed in order to implement hardware windows.

FIG. 16 is a Booch diagram demonstrating TInternalWindow being subclassed in order to implement hardware windows. TInternalWindow 1600 is an abstract base class for internal windows. TXYZInternalWindow 1602 represents a hardware window subclass. In FIG. 16, 1602 represents a hardware window subclass from a hypothetical XYZ Corporation. TFlatFrameBufferInternalWindow 1604 represents a window which is suitable for flat framebuffers.

TInternalWindow 1602 has the following responsibilities:

1) Maintaining the extent (position and size), expressed as a TGArea, of the window.

2) Moving the window when its position changes. For software windows, this means doing a copybits of the visible window contents. For hardware windows that employ hardware scrolling, this means writing some registers to move the window.

3) Returning the following information about the window:
—Can it calculate it's own visible area? Software windows normally do not, the window does it for them. Some hardware windows can (They can do this because the hardware windows are constrained to be on top of all software windows). If the window can calculate its own visible area, then the window doesn't have to.
—Can it calculate it's own damaged area? Again, the Window Server does this normally unless the window can do it itself.

4) Having setters and getters for the visible and update areas. Hardware windows need to keep these areas current if the hardware is calculating them.

5) Whenever a window changes position, the Window Server hands the window a list of it's internal windows in front-to-back order. Hardware windows can use this information to determine visible and update areas.

6) Private housekeeping for the window, meaning that subclassers don't have to worry about many details.

When writing hardware window device drivers, TInternalWindow must be subclassed while maintaining the above responsibilities. If a device doesn't support hardware windows and looks like a flat frame buffer, then TInternalWindow and TSystemWindow do not have to be subclassed. The stock classes will behave just fine.

Figure 17:
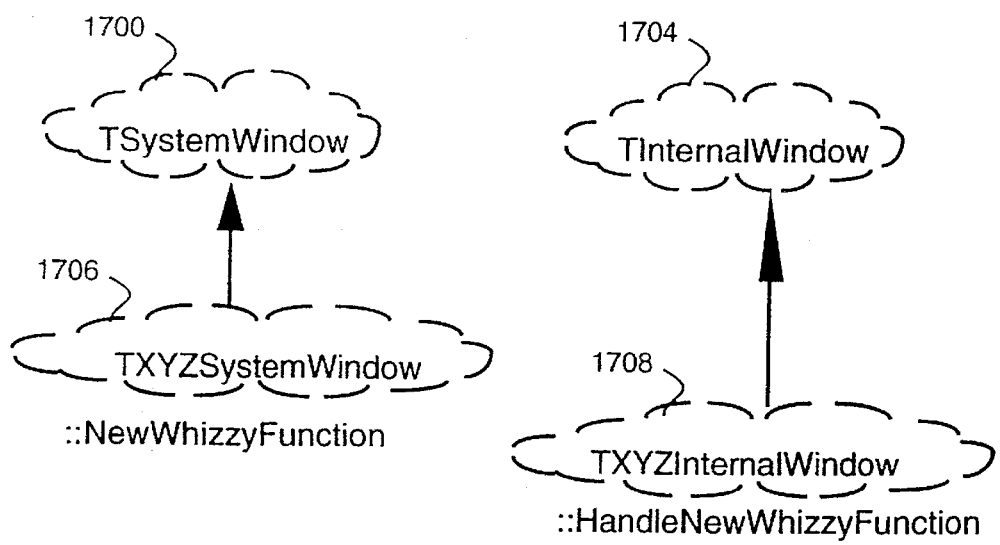
FIG. 17 is a Booch diagram showing the subclassing of TSystem Window and TInternalWindow.

FIG. 17 is a Booch diagram showing addition of new member functions to a system window subclass by the subclassing of TSystemWindow 1700 and TInternalWindow 1704. As shown, TSystemWindow 1700 can also be subclassed, as illustrated by TXYZSystemWIndow 1706, if extra member functions need to be added to it. Generally, if TSystemWindow 1700 is subclassed, then TInternalWindow 1704 must be subclassed also in order to add private handler member functions that actually do the work. The subclassing of TInternalWindow is shown by TXYZInternalWindow 1708.

Display Devices

Figure 18:
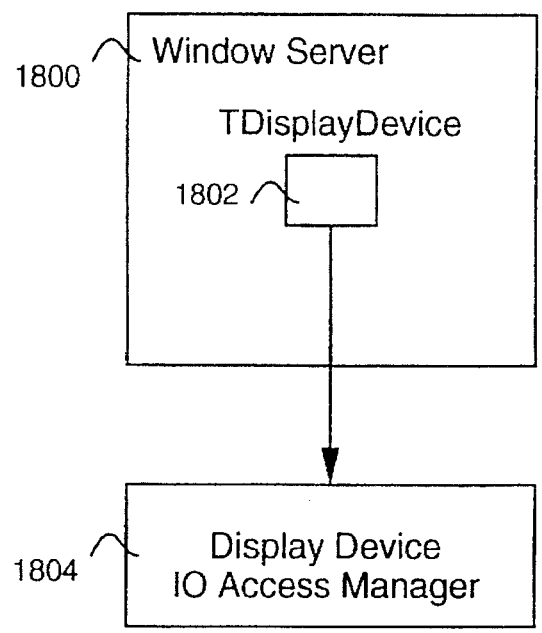
FIG. 18 is a block diagram which shows that for each display device that makes up the desktop, there is a TDisplayDevice that lives in the window.

FIG. 18 is a block diagram which shows that for each display device that makes up the desktop, there is a TDisplayDevice 1802 that lives in the Window Server 1800. The display device communicates with the display's IO Access Manager 1804 as necessary. TDisplayDevice 1802 resides in the Window Server 1800. Display devices are responsible for creating internal windows as well as maintaining device-specific information that may be need to be referenced by internal windows.

Creating Internal Windows

Figure 19:
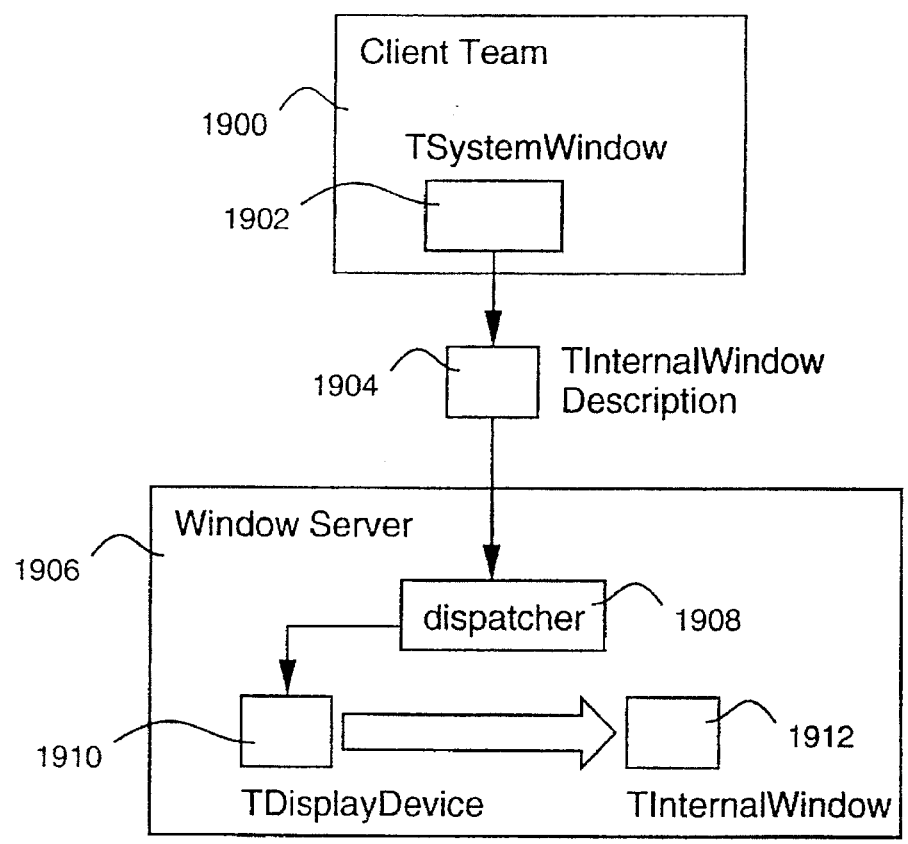
FIG. 19 is a block diagram illustrating how internal windows are created.

FIG. 19 is a block diagram illustrating how internal windows are created.

1) Client team 1900 instantiates a TSystemWindow 1902.

2) TSystemWindow 1902 packages window parameters into a TInternalWindowDescription 1904 and sends it to the dispatcher 1908 of Window Server 1906. TInternalWindowDescription 1904 has all the parameters necessary to create a window (those described in Creating and Deleting System Windows, above), including the window's size and position (described as a TGArea). It can be subclassed to add new parameters if TSystemWindow 1902 and TInternalWindow 1912 are subclassed and require additional construction parameters.

3) The window figures out which display device the window is on. It asks the display device to create a TInternalWindow 1912 via TDisplayDevice 1910. (The case where the window spans multiple monitors is described in the next section, Spanning Monitors).

4) The display device creates either a TInternalWindow 1912 (if it is a flat framebuffer) or a subclass (if it supports hardware windows or other additional functionality).

Spanning Monitors

Figure 20:
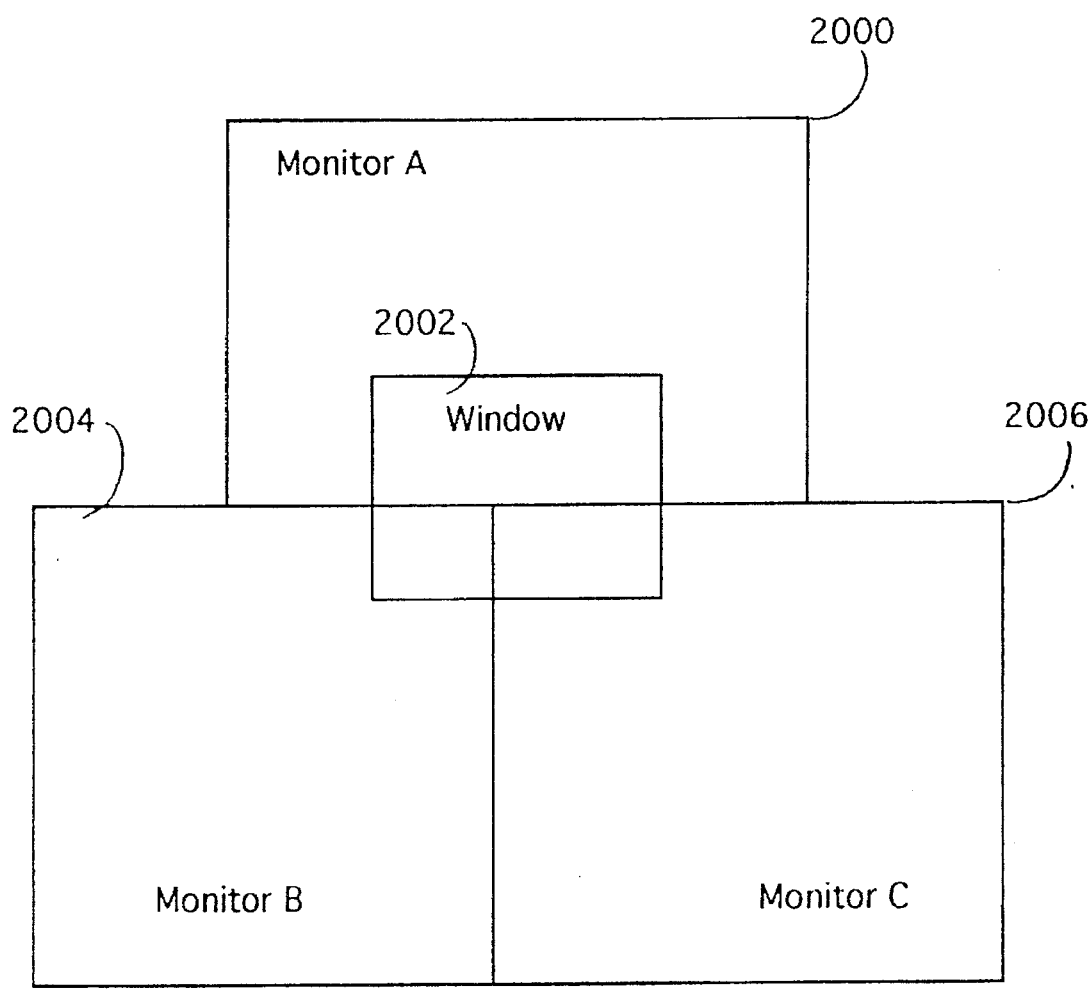
FIG. 20 illustrates by block diagram a window which spans three different monitors.

FIG. 20 illustrates by block diagram a window which spans three different monitors. In the example, monitor A 2000 is a simple frame buffer. Monitor B 2004 supports hardware windows. And monitor C 2006 supports a different kind of hardware window than monitor B 2004. The window 2002 is spanning the three monitors.

Figure 21:
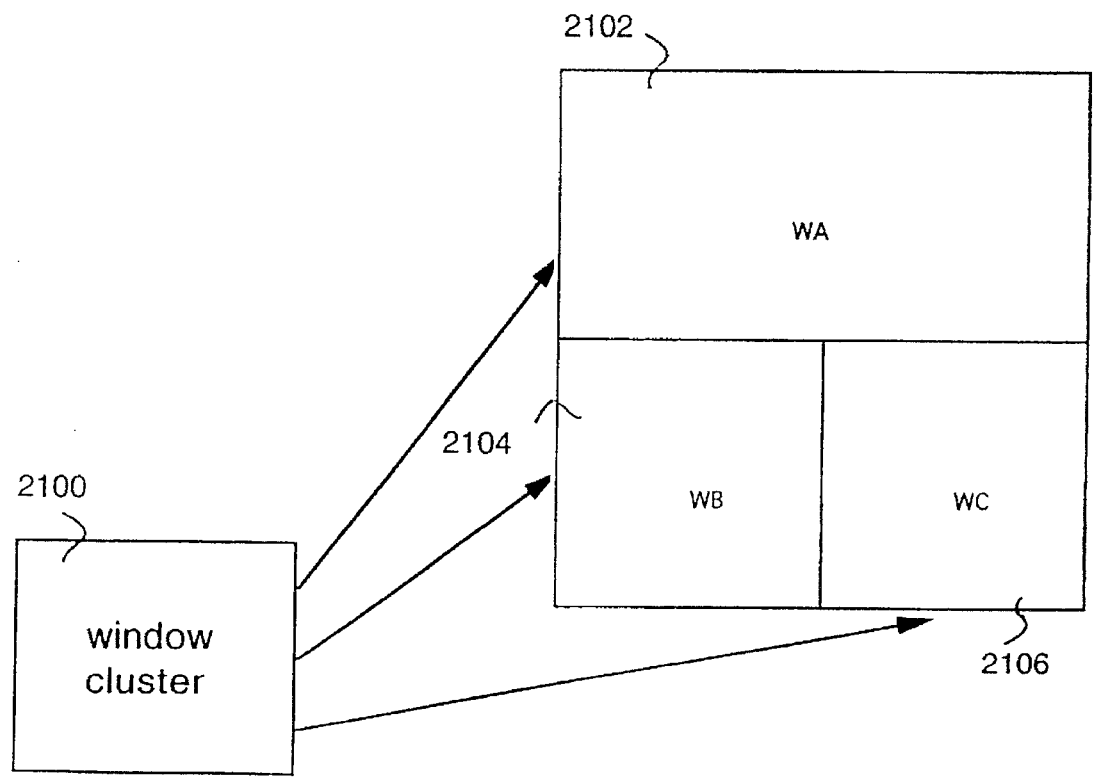
FIG. 21 illustrates the system used to enable the window to span the three monitors.
Figure 22:
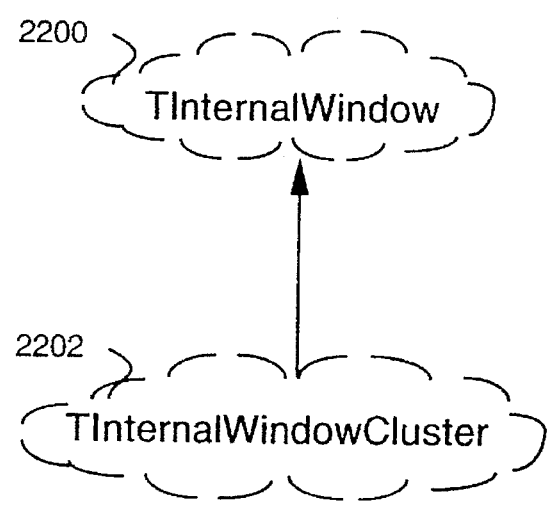
FIG. 22 is a Booch diagram illustrating the objects necessary to support the spanning of monitors.

FIG. 21 illustrates the system used to enable the window to span the three monitors. FIG. 22 is a Booch diagram illustrating the objects necessary to support the spanning of monitors. The window handles this by creating a subclass of TInternalWindow, TInternalWindowCluster (2202). TInternalWindowCluster 2202 is an internal window that "has" three other internal windows (2102, 2104, 2106). The three component internal windows are created by the display device, as described in the preceding section.

When the window cluster 2100 is told to move, it turns around and tells it's component internal windows to move and change their sizes as appropriate. The same is true for all other window requests to the cluster, the cluster does some interpretation and passes them on the components.

The implementor has the choice of when to create internal window clusters. One could try to optimize by creating clusters only when necessary (e.g. when a window spans dissimilar monitors), or choose a simpler solution where a cluster is created for every window, even if the window is contained within a single monitor.

A simpler alternative to the above solution may also be considered: Whenever a window spans more than one monitor, it reverts to a stock software window. It can do this by calling inherited member functions of TInternalWindow. This solution is simpler, but has the disadvantage that a display device does not know of all windows on its screen. This information can be useful in accelerating visible and update region calculations.

An easy way for TXYZInternalWindow to revert to a stock TFlatFrameBufferWindow would be to inherit from TFlatFrameBufferWIndow and call inherited member functions whenever it needs to revert.

Some hardware devices can only support a fixed number of hardware windows. In this case, it is the responsibility of the TInternalWindow subclass to revert to a stock software window when the number of hardware windows is exceeded.

It is contemplated that some TInternalWindow subclasses will need to communicate with their corresponding TDisplayDevice to figure out when the maximum number of hardware windows is exceeded. The TDisplayDevice subclass would maintain the count of existing hardware windows. TInternalWindow would query the display device to get this information.

It is possible for a Client, when creating a system window, to request a hardware window. This is done by directly instantiating a TSystemWindow subclass instead of TSystemWindow.

This is useful for applications that know they only work on a specific hardware device, such as applications that use the IBM ActionMedia II Playback card. This card is capable of decompressing digital video and displaying it on an on-board frame buffer, but nowhere else.

There are times when a view may want to know what type of display device (or devices) it is being displayed on. This would allow TView subclassers to make use of some fancy features provided by hardware. TSystemWindow has a member function which returns an iterator that allows the Client to iterator over all TDisplayDeviceHandles that the window is positioned on. View subclassers can use this information to determine what device their view is on and act accordingly.

While the invention is described in terms of preferred embodiments in a specific system environment, those skilled in the art will recognize that the invention can be practiced, with modification, in other and different hardware and software environments within the spirit and scope of the appended claims.

Having thus described our invention, what we claim as new, and desire to secure by Letters Patent is:

1. An apparatus for allocating and managing a plurality of windows on a display device for use by client applications and a user, the apparatus comprising:

(a) a screen buffer for storing display information, the display information being mapped to picture elements of the display device;

(b) a display adapter for obtaining the display information from the screen buffer and responsively causing an image to be displayed on the display device;

(c) a memory holding the client applications;

(d) a processor under the control of the client applications;

(e) visible area managing means, responsive to a user window manipulation request, for maintaining visible area definitions of each of the windows, each visible area definition defining a clipping region of an associated window and specifying a portion of the screen buffer to hold screen information for the associated window;

(f) update area managing means, responsive to a user window manipulation request, for maintaining update area definitions for each of the windows, each update area definition defining a damaged region of the window that is damaged as a result of the user manipulation request, the update area managing means including notification means for notifying a client application that the update area definition of a window is non-empty; and (g) window creation means, responsive to a client application window creation request, for creating a new window on the display device, the window creation means including means for creating in an address space of the memory associated with the requesting client application a window object associated with the new window, the window object having means for obtaining a valid cached copy of a visible area definition for the associated window from the visible area managing means;

wherein each client application Includes means for issuing a window creation request to the window creation means to thereby create an associated window object, and wherein the client application further includes means for invoking the window object created in the address space of the client application to obtain a valid cached copy of a visible area definition;

means for directly storing display information in the portion of the screen buffer specified by the obtained, valid cached visible area definition; and means for updating a damaged region of a window under the control of an update area definition and in response to being notified by the notification means.

2. The apparatus of claim 1 wherein the visible area managing means maintains the visible area definitions in a shared region of the memory, the shared region being protected against simultaneous multiple use by semaphore controls.

3. The apparatus of claim 2 wherein the visible area managing means includes means for maintaining in the memory time stamps for each of the visible area definitions to indicate a version of the visible area definition, and wherein each window object includes a cached version of the visible area definition for the associated window and includes a cached time stamp indicating a version of the cached copy of the visible area definition, and wherein the means for obtaining a valid cached copy of a visible area definition includes means for obtaining the time stamp of a visible area definition from the visible area managing means, means for comparing the time stamp to the cached time stamp to determine whether the cached copy of the visible area definition is a current version, and means for retrieving a visible area definition from the visible area managing means, if the means for comparing indicates the cached copy of the visible area definition is not a current version.

4. The apparatus of claim 2 wherein the semaphore controls includes a drawing semaphore with a shared mode and an exclusive mode, wherein a client application and associated window object includes means for acquiring the drawing semaphore under the shared mode, when storing display information in the screen buffer, so as to allow another client application to also store display information in the screen buffer; and wherein the window creation means includes means for acquiring the drawing semaphore under the exclusive mode, when creating a new window, so as to prohibit the client applications from using the screen buffer, while the drawing semaphore is acquired under the exclusive mode.

5. The apparatus of claim 4 wherein the drawing semaphore is a recoverable semaphore and wherein the apparatus further includes means for detecting whether the client applications or the window creation means has died without releasing the semaphore and for releasing the semaphore, in response thereto.

6. The apparatus of claim 1 wherein the client application window creation request includes parameter information indicating whether damaged regions of the new window should be automatically erased, and wherein the apparatus includes means for maintaining the information indicating whether damaged regions of the windows should be automatically erased, and wherein the update area managing means includes means for erasing the damaged region of a window before notifying a client application with the notification means that the update area of a window is non-empty.

7. The apparatus of claim 1 wherein the apparatus includes a window object class definition in the memory, the window object class definition defining a polymorphic protocol of communication between a window object and a client application, and wherein the means for creating a window object includes means for instantiating the window object from the window object class definition, and wherein the apparatus further includes a hardware window object subclass in the memory and being derived from and thereby inheriting the polymorphic protocol of communication of, the window object class, a hardware window drawing device for storing display information in the screen buffer, hardware window creation means, responsive to a hardware window creation request, for creating a hardware window, the hardware window creation means including means for creating a hardware window object in the memory by instantiating a hardware window object from the hardware window object subclass, the hardware window object having means for controlling the hardware window drawing device to store display information of the hardware window in the screen buffer; and wherein the client application includes means for communicating under the polymorphic protocol so as to select, during run-time of the client application, between a window object and a hardware window object to cause display information to be stored in the screen buffer, thereby allowing a client application to use the hardware window drawing device if it is present, while allowing the client application to remain operable regardless of whether the hardware window drawing device is present.

8. A computer-implemented method of allocating and managing a plurality of windows on a display device for use by client applications and a user, in a computer system having a screen buffer for storing display information, the display information being mapped to picture elements of the display device, a display adapter for obtaining the display information from the screen buffer and responsively causing an image to be displayed on the display device, a memory holding the client applications, and a processor under the control of the client applications, the method comprising the steps of:

(a) in response to a user window manipulation request, maintaining visible area definitions of each of the windows, each visible area definition defining a clipping region of an associated window and specifying a portion of the screen buffer to hold screen information for the associated window;

(b) in response to a user window manipulation request, maintaining update area definitions for each of the windows, each update area definition defining a damaged region of the window that is damaged as a result of the user manipulation request, (c) notifying a client application that the update area definition of a window is non-empty;

(d) in response to a client application window creation request, creating a new window on the display device, including the step of creating in an address space of the memory associated with the requesting client application a window object associated with the new window, the window object having a mechanism for obtaining a valid cached copy of a visible area definition for the associated window;

(e) each client application issuing a window creation request to thereby create an associated window object;

(f) each client application invoking the window object to thereby obtain the valid cached copy of the visible area definition of the window object (g) each client application using the obtained, valid cached copy of the visible area definition to directly store display information in the portion of the screen buffer specified by the visible area definition of the window object; and (g) each client application updating a damaged region of a window under the control of an update area definition In response to being notified that the update area of a window is non-empty.

9. The method of claim 8 wherein step (a) includes the step of (a.1) maintaining the visible area definitions in a shared region of the memory, the shared region being protected against simultaneous multiple use by semaphore controls.

10. The method of claim 9 wherein step (a) includes the step of (a.2) maintaining in the memory time stamps for each of the visible area definitions to indicate a version of the visible area definition, and wherein step (d) includes the step of d.1) creating a window object that includes a mechanism for holding a cached version of the visible area definition for the associated window and includes a mechanism for holding a cached time stamp indicating a version of the cached copy of the visible area definition, and wherein the mechanism for obtaining a valid cached copy of a visible area definition comprises the following steps:

(d.1.1) obtaining the time stamp of a visible area definition, (d.1.2) comparing the time stamp to the cached time stamp to determine whether the cached copy of the visible area definition is a current version, and (d.1.3) retrieving a visible area definition from the visible area managing means, if the means for comparing indicates the cached copy of the visible area definition is not a current version.

11. The method of claim 9 wherein the semaphore controls includes a drawing semaphore with a shared mode and an exclusive mode, and wherein the method further comprises the steps of (h) a client application and associated window object acquiring the drawing semaphore under the shared mode, when storing display information in the screen buffer, so as to allow another client application to also store display information in the screen buffer; and wherein step (d) includes the step of (d.2) acquiring the drawing semaphore under the exclusive mode, when creating a new window, so as to prohibit the client applications from using the screen buffer, while the drawing semaphore is acquired under the exclusive mode.

12. The method of claim 11 wherein the drawing semaphore is a recoverable semaphore and wherein the method further includes the steps of (i) detecting whether the client applications or another mechanism has died without releasing the semaphore, and (j) releasing the semaphore, in response to step (i).

13. The method of claim 8 wherein the client application window creation request includes parameter information indicating whether damaged regions of the new window should be automatically erased, and wherein the method further includes the step of (k) maintaining the information indicating whether damage regions of the windows should be automatically erased, and (l) erasing the damaged region of a window before performing notifying step (c).

14. The method of claim 8 wherein the computer system includes a window object class definition in the memory, defining a polymorphic protocol of communication between a window object and a client application, and a hardware window drawing device for storing display information in the screen buffer, and wherein the method further includes the steps of (m) defining a hardware window object subclass in the memory by deriving the subclass from the window object class, thereby causing the subclass to inherit the polymorphic protocol of communication of the window object class, (n) in response to a hardware window creation request, creating a hardware window, the hardware window creation means including the step of creating a hardware window object in the memory by instantiating a hardware window object from the hardware window object subclass, the hardware window object having a mechanism for controlling the hardware window drawing device to store display information of the hardware window in the screen buffer; and (o) a client application communicating under the polymorphic protocol so as to select, during run-time of the client application, between a window object and a hardware window object to cause display information to be stored in the screen buffer, thereby allowing a client application to use the hardware window drawing device if it is present, while allowing the client application to remain operable regardless of whether the hardware window drawing device is present.

* * * * *